US012450701B2

(12) United States Patent
Yang et al.

(10) Patent No.: US 12,450,701 B2
(45) Date of Patent: Oct. 21, 2025

(54) ELECTRONIC DEVICES AND CORRESPONDING METHODS FOR CREATING AND PRESENTING ALTERED IMAGE SENSOR DATA SIMULATING A BOKEH EFFECT

(71) Applicant: Motorola Mobility LLC, Chicago, IL (US)

(72) Inventors: Emily Yang, Chicago, IL (US); John Pincenti, Chicago, IL (US)

(73) Assignee: Motorola Mobility LLC, Chicago, IL (US)

(*) Notice: Subject to any disclaimer, the term of this patent is extended or adjusted under 35 U.S.C. 154(b) by 315 days.

(21) Appl. No.: 18/215,646

(22) Filed: Jun. 28, 2023

(65) Prior Publication Data

US 2025/0005721 A1  Jan. 2, 2025

(51) Int. Cl.
*G06T 5/70* (2024.01)
*G06T 5/20* (2006.01)
*H04N 23/71* (2023.01)
*H04N 23/85* (2023.01)
*H04N 23/86* (2023.01)

(52) U.S. Cl.
CPC .............. *G06T 5/70* (2024.01); *G06T 5/20* (2013.01); *H04N 23/71* (2023.01); *H04N 23/85* (2023.01); *H04N 23/86* (2023.01); *G06T 2207/10024* (2013.01)

(58) Field of Classification Search
CPC ... G06T 5/70; G06T 5/20; G06T 2207/10024; H04N 23/71; H04N 23/85; H04N 23/86
See application file for complete search history.

(56) References Cited

U.S. PATENT DOCUMENTS

| 9,342,875 B2* | 5/2016 | Lei ........................... G06T 11/00 |
| 11,087,513 B1* | 8/2021 | Duan ....................... G06T 11/60 |
| 11,368,626 B2 | 6/2022 | Mashimo et al. |
| 2015/0146994 A1* | 5/2015 | Arnison ................... G06T 7/571 |
| | | 382/254 |

(Continued)

OTHER PUBLICATIONS

Vázquez-Padín, David, Fernando Pérez-González, and Pablo Pérez-Miguélez. "Apple's Synthetic Defocus Noise Pattern: Characterization and Forensic Applications." arXiv preprint arXiv:2505.07380 (2025). (Year: 2025).*

(Continued)

*Primary Examiner* — Andrae S Allison
(74) *Attorney, Agent, or Firm* — Philip H. Burrus, IV

(57) ABSTRACT

An electronic device includes an image capture device configured to capture image sensor data in response to initiation of an image capture operation. The electronic device includes one or more processors and a display operable with the one or more processors. The one or more processors select saturated pixels of the image sensor data and determine a gain factor as a function of brightness values of pixels in the image sensor data. The one or more processors increase an intensity value of the saturated pixels by the gain factor to create scaled image sensor data, blur at least some of the scaled image sensor data by convolving a blur kernel with the scaled image sensor data to create altered image sensor data exhibiting a simulated bokeh effect and cause the display to present the altered image sensor data exhibiting the simulated bokeh effect.

20 Claims, 23 Drawing Sheets

(56) References Cited

U.S. PATENT DOCUMENTS

| | | | |
|---|---|---|---|
| 2015/0178970 A1 | 6/2015 | Pham | |
| 2015/0234865 A1* | 8/2015 | Iida | G06V 40/166 |
| | | | 348/349 |
| 2016/0094779 A1* | 3/2016 | Arakawa | H04N 23/72 |
| | | | 348/348 |
| 2017/0061635 A1* | 3/2017 | Oberheu | G06T 7/586 |
| 2019/0213714 A1 | 7/2019 | Neti et al. | |
| 2019/0230295 A1* | 7/2019 | Pincenti | G06T 3/4038 |
| 2019/0379824 A1* | 12/2019 | McGarvey | H04N 23/667 |
| 2020/0265565 A1 | 8/2020 | Hwang et al. | |
| 2021/0166353 A1 | 6/2021 | Chen | |
| 2022/0030139 A1* | 1/2022 | Koppetz | G06F 3/147 |
| 2022/0036513 A1 | 2/2022 | Luo et al. | |
| 2022/0270215 A1 | 8/2022 | Lee | |
| 2023/0146844 A1* | 5/2023 | Kano | G06T 5/20 |
| | | | 382/255 |
| 2024/0177274 A1* | 5/2024 | Scharam | G06T 5/20 |

OTHER PUBLICATIONS

Kyaw, Okka. A Realistic Camera Model for Real-time Rendering. Diss. Rochester Institute of Technology, 2013. (Year: 2013).*

McGraw, Tim. "Fast Bokeh effects using low-rank linear filters." The Visual Computer 31 (2015): 601-611. (Year: 2015).*

Zhou, Yuqian, et al. "Image restoration for under-display camera." Proceedings of the ieee/cvf conference on computer vision and pattern recognition. 2021. (Year: 2021).*

"Wikipedia Channel (digital image)", As published online May 19, 2023 at https://en.wikipedia.org/wiki/Channel_(digital_image).

"Wikipedia Explanation of Convolution", Viewed online May 19, 2023 at https://en.wikipedia.org/wiki/Convolution.

Dean, Patrick , "The Circle(x) Function", Published Jul. 23, 2020 online at https://medium.com/@PeachLaw/the-circ-x-function-9e0e9b05c815#:~: text=The%20circ%20function%20is%20periodic, value%20of%20circ(c).

* cited by examiner

— PRIOR ART —

— PRIOR ART —

-- PRIOR ART --

-- PRIOR ART --

ELECTRONIC DEVICES AND CORRESPONDING METHODS FOR CREATING AND PRESENTING ALTERED IMAGE SENSOR DATA SIMULATING A BOKEH EFFECT

BACKGROUND

Technical Field

This disclosure relates generally to electronic devices, and more particularly to electronic devices having image capture devices.

Background Art

Modern electronic devices, examples of which include smartphones, tablet computers, and laptop computers, generally include at least one image capture device in the form of one or more cameras. These cameras can be used to capture images and video. To keep the overall size of these devices compact, the image capture devices are generally very small with short focal lengths and relatively small apertures. These features give rise to the ability of modern smartphones and other electronic devices to capture incredibly sharp, high-quality images.

"Bokeh" is an aesthetic effect that happens when some points of light are out of focus within a compose image. It is pleasing to the eye because it softens what can sometimes be harsh lights in the background. Bokeh is desirable because it draws the viewer's focus toward subjects in the foreground. Traditional bokeh is the result of large image capture device apertures combined with short distances between a camera and a subject. Given the small nature of modern electronic devices, bokeh cannot be performed optically. Instead, it must be performed computationally. However, the process is slow and computationally heavy. It would be advantageous to have improved electronic devices and corresponding methods for simulating bokeh.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
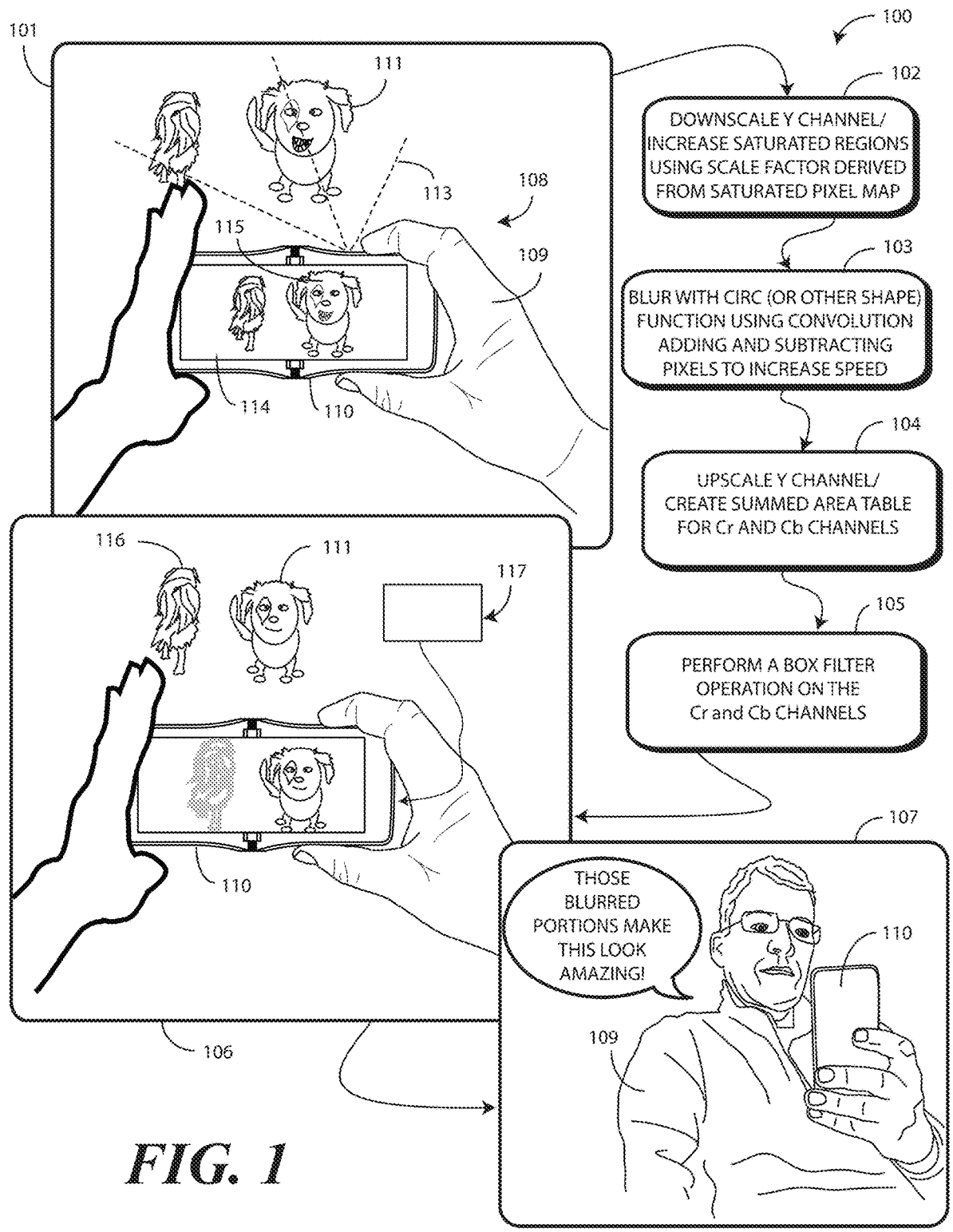
FIG. 1 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to blurring at least some image sensor data by convolving a blur kernel having a predefined shape with the image sensor data to create altered image sensor data exhibiting a simulated bokeh effect and presenting the altered image sensor data on a user interface of an electronic device. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of blurring scaled image sensor data by convolving a blur kernel with the scaled image sensor data to create altered image sensor data exhibiting a simulated bokeh effect and causing a display to present the altered image sensor data exhibiting the simulated bokeh effect as described herein. The non-processor circuits may include, but are not limited to, a radio receiver, a radio transmitter, signal drivers, clock circuits, power source circuits, and user input devices.

As such, these functions may be interpreted as steps of a method to perform blurring at least some scaled image sensor data by convolving a blur kernel with the scaled image sensor data to create altered image sensor data exhibiting a simulated bokeh effect and presenting the altered image sensor data on a user interface of an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, bokeh is an aesthetic effect that happens when points of light, generally in the background of an image, are out of focus. When a bokeh effect is present in images they tend to soften harsh lights from the background, which draws the eyes toward the subject in the foreground. Most commonly, points of light affected by bokeh appear as soft, circular spots. Bokeh is commonly used in night photography.

With traditional single lens reflex (SLR) cameras, the amount of bokeh, e.g., how big the lights are, the shape of the lights, and the amount of blur, is a function of the depth of field and the aperture shape, respectively. Points of light that are at the correct focal distance from the lens of the camera will appear in focus as small dots. However, if these points are either in front of, or behind, the focal plane, the light will appear as larger circles instead.

Illustrating by example, when a photograph of a subject is captured with a large aperture and small depth of field, thereby focusing on the subject while blurring object that lie outside of the depth of field, this composition of image tends to highlight the subject inside the depth of field while blurring background portions of the scene that lie outside the depth of field. The resulting aesthetic quality is referred to as bokeh. While primarily affected by depth of field, the aperture shape also plays a role in the bokeh affect. Lens aberrations and variations in camera aperture shapes can cause the type of bokeh applied to vary from that which is very pleasing to the eye to, in other instances, blurring that is unpleasant or distracting. This is true because the shape of the blur is a projection of the lens aperture. Where the lens aperture is a circle, blurred points of light will be round. Where the lens aperture is a polygon, the blurred points of light will be polygonal, and so forth.

Almost all modern portable electronic devices, such as smartphones, tablet computers, gaming devices, laptop computers, and the like, include one or more image capture devices that are capable of capturing images or video. Due to the compact nature of such devices, they generally are not able to optically generate bokeh effects since their lenses are small and have limited motion. Additionally, their apertures are quite small compared to SLR cameras. Accordingly, their image capture devices may not be able to naturally generate bokeh effects.

Figure 3:
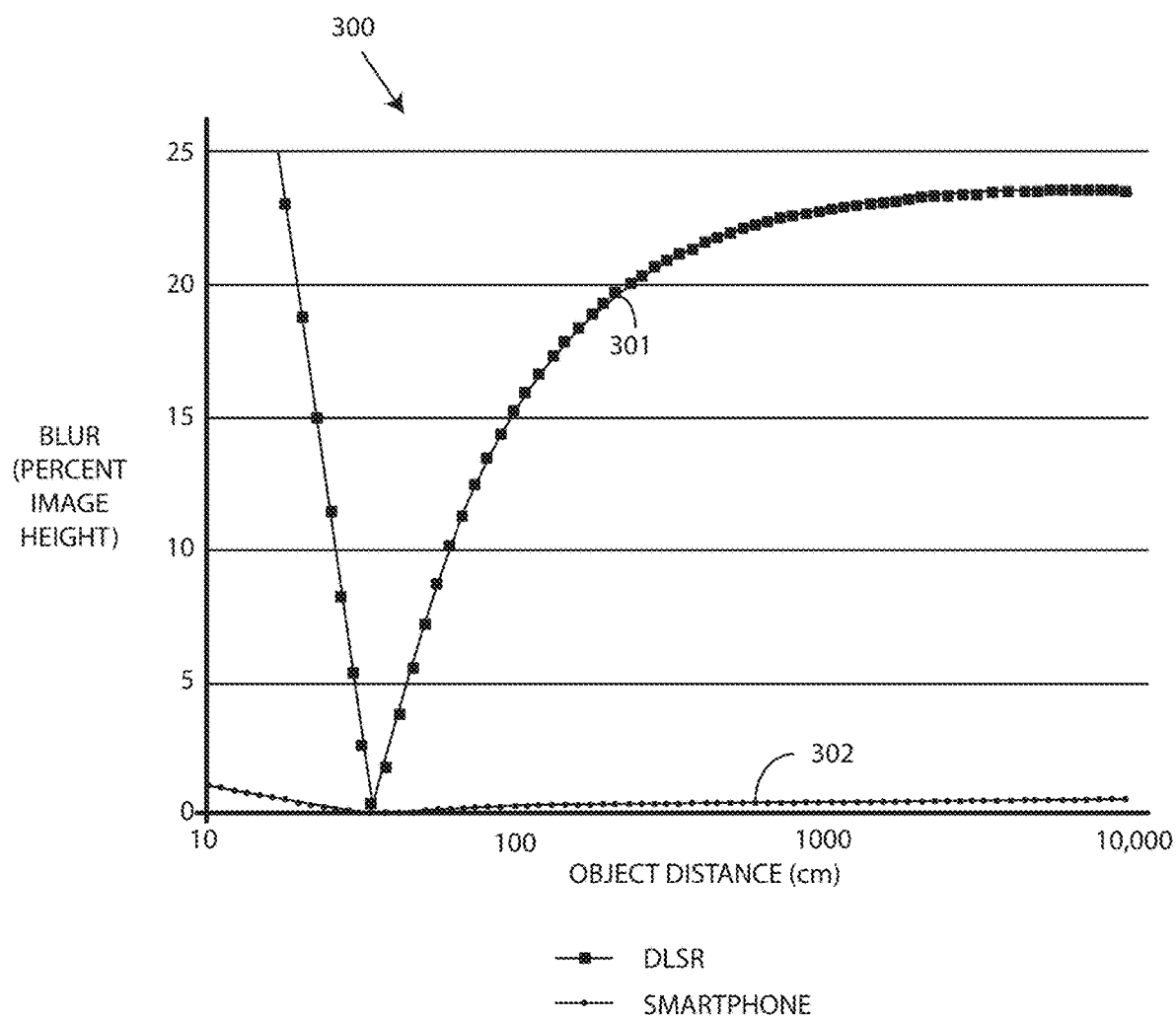
FIG. 3 illustrates one explanatory graph comparing bokeh effects in conventional digital single lens reflex image capture devices and smartphones.

Illustrating by example, turning briefly to FIG. 3, illustrated therein is a comparison 300 between the amount of blur 301 that can be achieved optically in an explanatory DSLR camera compared to the amount of blur 302 that can optically be achieved in an explanator smartphone. As shown, this difference is quite stark and is orders of magnitude.

For this reason, most portable electronic devices simulate bokeh effects using software instead. The problem with prior art software-based bokeh simulation systems is that they are slow and computationally intensive. For this reason, they are applied only to still images and are not suitable for situations where an image capture device is operating in a viewfinder mode of operation.

Figure 4:
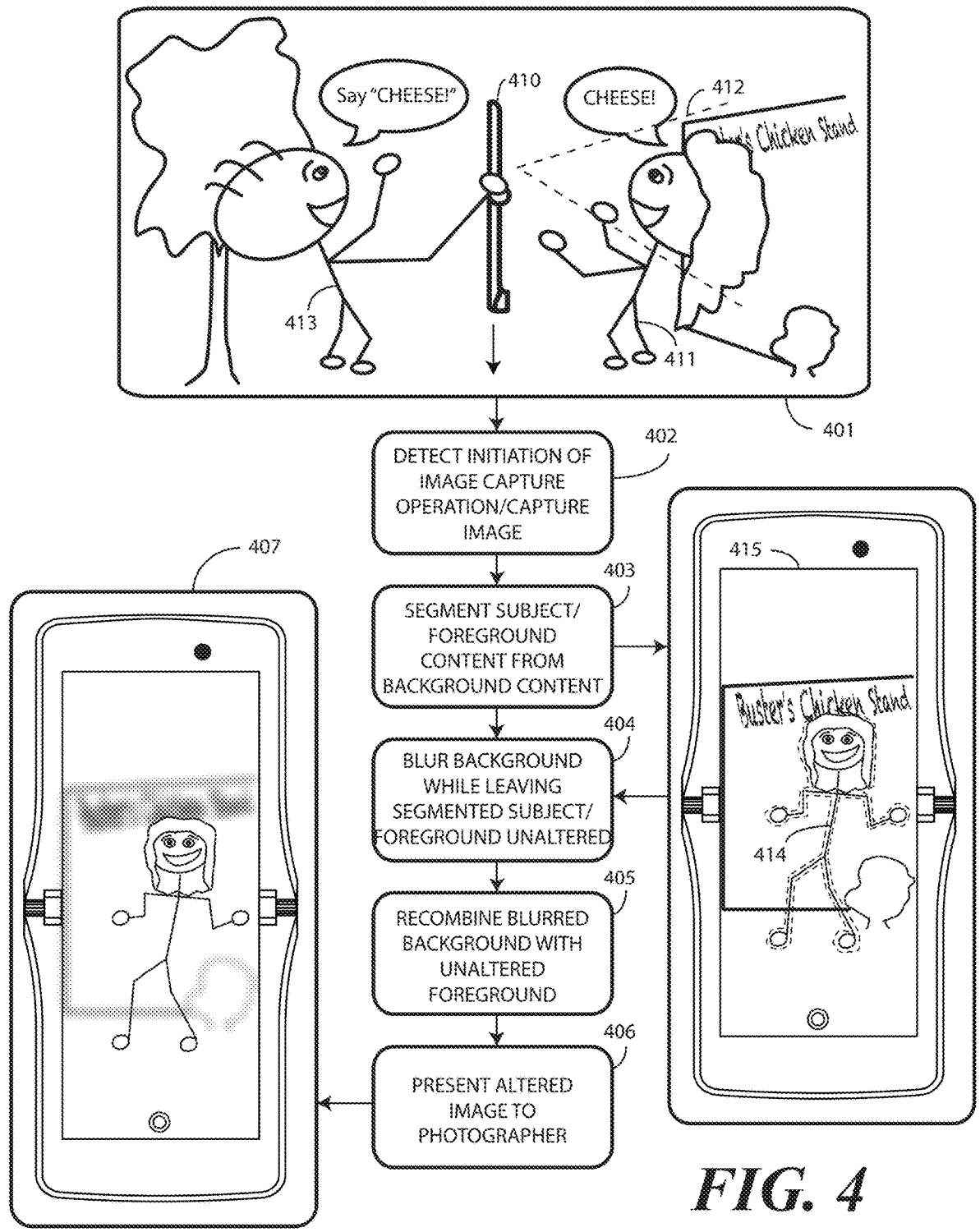
FIG. 4 illustrates a prior art method for simulating bokeh.

Illustrating by example, turning briefly to FIG. 4, illustrated therein is a prior art bokeh simulation technique. Beginning at step 401, a photographer 413 is using a prior art smartphone 410 to take a picture 412 of a subject 411. Initiation of the image capture operation is detected at step 402.

At step 403, the depiction 414 of the subject 411 is "cut" from the image 415. The entire image 415, with the exception of the depiction 414 of the subject 411, is then uniformly blurred at step 404. The depiction 414 of the subject 411 is thin superimposed over the image 415 at step 405, and is presented on the display at step 406, with the result being shown at step 407.

The problem with this method is twofold. First, the bokeh is just not very good. Rather than creating a beautiful aesthetic effect by making the points of light out of focus so as to draw the eye toward the subject, the entire background is just blurred and muddy. Instead of soft circular spots, everything is just out of focus. Second, and more importantly, this mechanical method of manipulating images is slow, clumsy, and computationally intensive. Thus, it cannot be used for anything other than post processing. It cannot, for example, be used for viewfinder modes of operation.

Advantageously, embodiments of the disclosure provide improved bokeh simulation methods suitable for use in portable electronic devices. In one or more embodiments, the method approaches the problem from two different perspectives. First, it works to generate realistic bokeh effects in a compact portable electronic device. This generation of realistic bokeh includes convolution of a blur kernel having a predefined shape with image sensor data to create altered image sensor data exhibiting a simulated bokeh effect, with this convolution being performed faster than prior art convolutions, and with saturated regions of an image having that saturation increased to produce projections in the shape of the blur kernel.

Second, methods described below are accelerated by employing a downscaling process of the luma (Y) channel of the image sensor data and applying a box filter to blur the blue projection (Cb) and red projection (Cr) channels. This allows embodiments of the disclosure to provide altered image sensor data that includes realistic bokeh effects even when an image capture device is operating in a viewfinder mode of operation.

In one or more embodiments, one or more processors of an electronic device receive image sensor data from an image sensor of an image capture device. The one or more processors then increase an intensity value of saturated pixels by a gain factor determined as a function of brightness values of pixels of the image sensor data. The one or more processors then blur at least some of the image sensor data by convolving a blur kernel having a predefined shape. In one or more embodiments, the one or more processors then present the altered image sensor data on a user interface of the electronic device.

In one or more embodiments, the predefined shape is that of a pixelated circle. This is achieved when the convolution is performed with a CIRC function. However, in other embodiments, the predefined shape can take other shapes. Illustrating by example, as will be shown below in the subsequent figures, in another embodiment the predefined shape can be a pixelated heart. In other embodiments, the predefined shape can be a pixelated snowflake, pixelated polygonal shape, or a pixelated free-form shape. This list is illustrative only, as other predefined shapes will be obvious to those of ordinary skill in the art having the benefit of this disclosure.

In one or more embodiments, the blur kernel has a dimension of N pixels by N pixels. In one or more embodiments, the convolution comprises performing a quick convolution consisting of a number of product operations that is proportional to 2*N and less than N*N. Embodiments of the disclosure contemplate that as the blur kernel moves across an image, only new pixels falling within the blur kernel and old pixels moving out of the blur kernel require mathematical attention to perform the convolution. For those pixels remaining within the blur kernel both before and after a movement of the blur kernel, their convolution products are known. Accordingly, rather than performing N*N calculations for each and every movement of the blur kernel, in one or more embodiments only 2*N calculations are performed to account for the pixels moving into the blur kernel and those moving out of the blur kernel.

Accordingly, in one or more embodiments the predefined shape spans a plurality of pixels of the image sensor data and the convolving the blur kernel comprises translating the predefined shape across the image sensor data while adding convolution product values for a first set of pixels entering the predefined shape when the blur kernel translates and subtracting convolution product values for a second set of pixels exiting the predefined shape when the blur kernel translates. For a third set of pixels remaining within the blur kernel when it translates, recalculating the product values is omitted. This makes convolution using a CIRC function as fast as if a Gaussian function were being used.

Embodiments of the disclosure contemplate that merely blurring image sensor data with a blur kernel having a predefined shape alone will not produce optimal bokeh within an image around light sources or highlights. This is true because in a captured image these regions have been clipped and information has been lost. In one or more embodiments, to provide a more realistic bokeh effect, embodiments of the disclosure increase the intensity of the saturated regions before the convolution is performed.

In one or more embodiments, a map is made of all the saturated pixels, which are pixels with luminous intensity above a predefined threshold. Empirically, a threshold of 248 (on an 8-bit scale) provides very good results.

Thereafter, using the luma values from the image capture device, the average brightness around each saturated pixel is determined. In one or more embodiments, one or more processors of the electronic device determine an average brightness value by creating a summed area table for the predetermined number of pixels surrounding, and including, each saturated pixel. In one or more embodiments, the saturated pixels each have a luma value greater than a predefined minimum luma value threshold. In one or more embodiments, the predetermined number of pixels surrounding, and including each saturated pixels is less than a predetermined maximum saturated pixel count threshold. The use of a summed area table to find the average brightness, combined with using a single luma channel instead of three color channels, makes the saturation increase very fast.

In one or more embodiments, the one or more processors increase an intensity value of saturated pixels by a gain factor determined as a function of brightness values of pixels of the image sensor data. In one or more embodiments, the gain factor has a formula of G=K1*Bv+K3, where G represents the gain factor, Bv represents a brightness value associated with the saturated pixels, and K1 and K3 are tunable constants. In one or more embodiments, Bv represents an average brightness value for a predefined number of pixels surrounding, and including, each saturated pixel. In one or more embodiments, when G is less than one, G is defined to be one. In one or more embodiments, this increasing of the saturated regions by the gain factor helps to produce simulated projections of a lens aperture around highlights of an image. In one or more embodiments, the shape of the simulated "lens aperture" is the shape of the blur kernel.

While the steps above provide a simple and expedient technique for simulating bokeh in a portable electronic device, embodiments contemplate that even more speed is advantageous when attempting to apply bokeh to image sensor data when an image capture device is operating in a viewfinder mode of operation. Accordingly, embodiments of the disclosure make the process even faster by downscaling the luma channel and blurring the blue projection channel and the red projection channel using a summed area table.

In one or more embodiments, before increasing the intensity value of the saturated pixels by the gain factor, the one or more processors downscale the luma channel of the image sensor data representing perceived intensity of pixels of the image sensor data. Thereafter, the one or more processors select the saturated pixels by determining which pixels of the image sensor data have a luma value greater than a predefined minimum luma value threshold and determine the average brightness value by creating a summed area table for the predetermined number of pixels surrounding, and including, each saturated pixel. Once the blurring is complete, to reverse the downscaling, the one or more processors upscale the luma channel of the altered image sensor data. The one or more processors then blur other image sensor data than that blurred by convolution by creating other summed area tables for the blue projection channel of the altered image sensor data and the red projection channel of the altered image sensor data. The one or more processors then apply a box filter to the other summed area table. This downscaling of the luma channel, combined with blurring the blue projection channel and red projection channel before again upscaling the luma channel, makes methods in accordance with embodiments of the disclosure even faster. Accordingly, the methods can be used to present altered image sensor data while an image capture device is operating in a viewfinder mode of operation.

Other advantages offered by methods and devices configured in accordance with embodiments of the disclosure will be described below. Still others will be obvious to those of ordinary skill in the art having the benefit of this disclosure.

Turning now to FIG. 1, illustrated therein is one explanatory method 100 and system 108 in accordance with one or more embodiments of the disclosure. Beginning at step 101, a user 109 is directing an image capture device (located on the rear side) of an electronic device 110 toward a subject 111. The user 109 is also delivering user input 112 initiating an image capture operation causing the image capture device to capture one or more images 115 of the subject 111.

In this illustrative embodiment, the user input 112 comprises the user 109 touching a physical button situated on the electronic device 110. In other embodiments, the user input 112 might comprise the user delivering touch input to a user actuation target or other icon presented on the display 114 of the electronic device 110. Other options for delivering user input 112 to the electronic device 110 to initiate the video capture operation will be obvious to those of ordinary skill in the art having the benefit of this disclosure.

At step 101, the image capture device captures the one or more images 115 in the form of image sensor data in response to the initiation of the image capture operation caused by the user input 112. At step 101, one or more processors of the electronic device 110 receive image sensor data corresponding to the one or more images 115 from the image sensor of the image capture device.

At step 102, one or more processors of the electronic device 110 downscale the luma channel of the image sensor data. As is understood in the art, the luma channel represents perceived intensity of pixels of the image sensor data.

In one or more embodiments, this downscaling occurring at step 102 occurs before a map is made of all the saturated pixels. Accordingly, in one or more embodiments the one or more processors select saturated pixels of the image sensor data by determining which pixels of the image sensor data have a luma value greater than a predefined minimum luma value threshold. As noted above, empirical testing suggests that a threshold of 248 in an 8-bit scale is one explanatory predefined threshold that works well in practice. Other predefined thresholds used to select saturated pixels will be obvious to those of ordinary skill in the art having the benefit of this disclosure. In one or more embodiments, the saturated pixels depict lights within a field of view 113 of the image capture device.

In one or more embodiments, the one or more processors of the electronic device 110 also increase the intensity of saturated pixels as well at step 102. Illustrating by example, in one or more embodiments the one or more processors determine an average brightness value for a predetermined number of pixels surrounding, and including, each saturated pixel. The one or more processors then determine a gain factor from the average brightness value. In one or more embodiments, the one or more processors then increase an intensity value of the saturated pixels by the gain factor to create scaled image sensor data at step 102.

At step 103, the one or more processors blur at least some of the scaled image sensor data by convolving a blur kernel with the scaled image sensor data to create altered image sensor data exhibiting a bokeh effect. In one or more embodiments, the blur kernel has a predefined shape. In one or more embodiments, the predefined shape is that of a projection of a lens aperture of the cpd. Illustrating by example, in one or more embodiments the predefined shape comprises a circle when the blur kernel is a CIRC function. Since the image sensor is defined by discrete pixels (rather than being a continuous surface of infinitely small pixels), the circle of the blur kernel becomes a pixelated circle in the image sensor data. Similarly, if the blur kernel has the shape of a heart, this becomes a pixelated heart, and so forth. While a circle is used in an explanatory shape of a blur kernel for illustrative purposes, it should be noted that the blur kernel can take other shapes as well. Examples include hearts, stars, snowflakes, polygons, free-form shapes, or other shapes.

At step 104, the one or more processors upscale the luma channel. In one or more embodiments, the one or more processors create a summed area table for the blue projection channel of the altered image sensor data and the red projection channel of the altered image sensor data to perform additional blurring. In one or more embodiments, this is done because application of a box filter using a summed area table is very fast. Even though the box filter has a box shape, the shape that is perceived by the eye of the viewer comes from the luma channel. Accordingly, at step 105 the one or more processors blur at least some other of the image sensor data by applying the box filter to the other summed area tables created for the red projection channel and the blue projection channel.

At step 106, the one or more processors present the altered image sensor data 117 on the display 114 of the electronic device 110. As shown, the object 116 in the background of the resulting image exhibits bokeh while the subject 111 of the resulting image is sharp and clear. As shown at step 107, the user 109 is awed and amazed, having never seen bokeh look so realistic in a compact electronic device 110 before.

Figure 2:
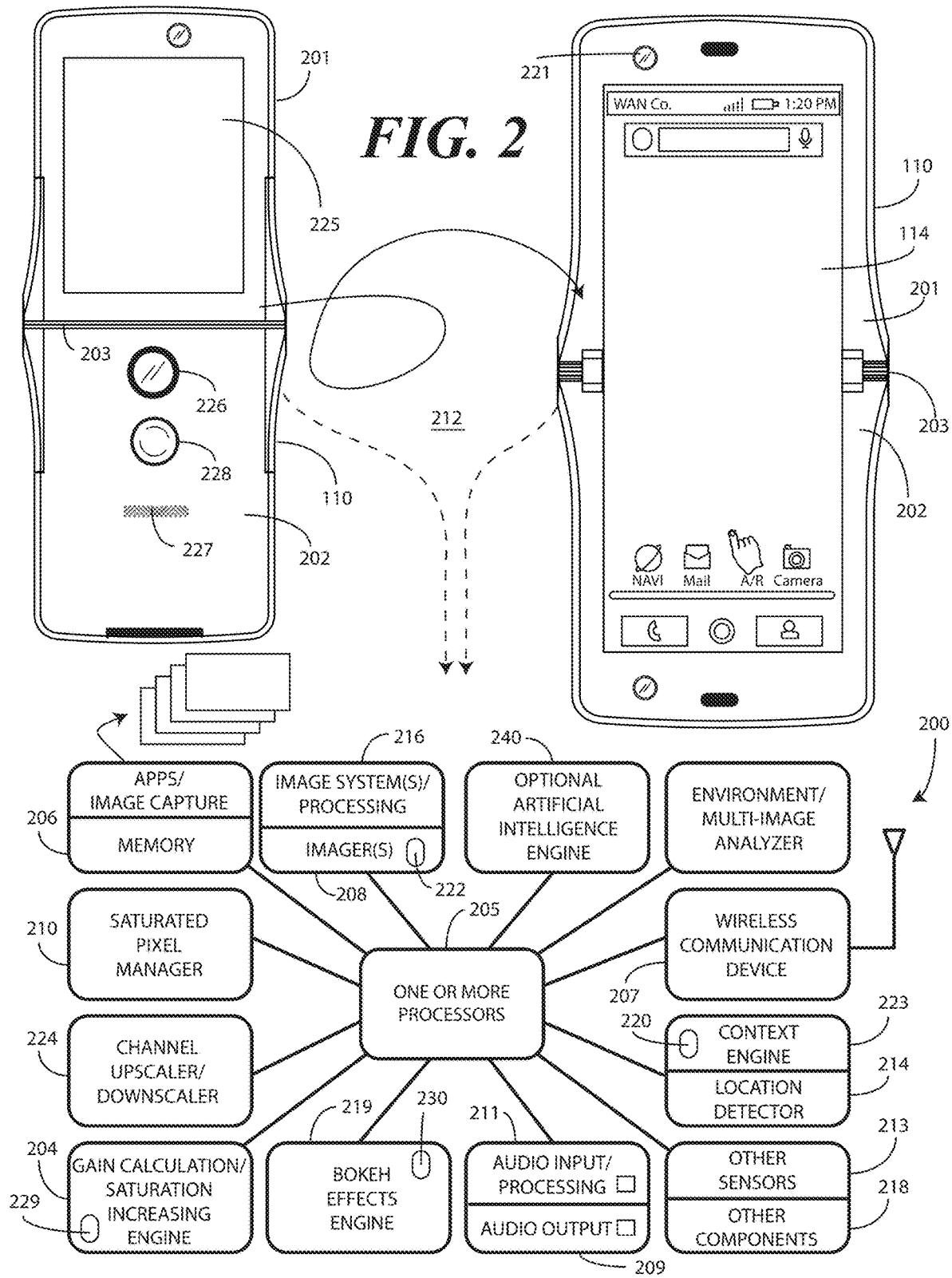
FIG. 2 illustrates one explanatory electronic device in accordance with one or more embodiments of the disclosure.

Turning now to FIG. 2, illustrated therein are more details of one explanatory electronic device 110 configured in accordance with one or more embodiments of the disclosure. While illustrated as a hinged electronic device, the electronic device 110 could include a singular housing that is not deformable and has no hinge, configured in a traditional "candy bar" form factor as well.

Where configured as a candy bar, the display 114 of electronic device 110 would remain exposed and accessible. By contrast, where configured as a hinged device having a first device housing 201 that is selectively pivotable about a hinge 203 relative to the second device housing 202 between a closed position and an axially displaced open position, the display 114 of the electronic device 110 can be selectively concealed and revealed, depending upon whether the electronic device is in the closed position or the axially displaced open position.

The electronic device 110 of FIG. 2 is configured as a portable electronic device, and for illustrative purposes is configured as a smartphone. However, the electronic device 110 could be configured in other ways as well. For example, the electronic device 110 could be configured as a tablet computer, a gaming device, a multimedia player, and so forth. Still other types of electronic devices can be configured in accordance with one or more embodiments of the disclosure as will be readily appreciated by those of ordinary skill in the art having the benefit of this disclosure.

The illustrative electronic device 110 of FIG. 2 includes multiple displays 114,225. A secondary display 225, which can be coupled to either of the first device housing 201 or the second device housing 202, is coupled to the first device housing 201 in this embodiment. This display 225 is considered to be an "exterior" display due to the fact that it is exposed when the first device housing 201 and the second device housing 202 are in the closed position.

The primary display, i.e., display 114, can also be coupled to either or both of the first device housing 201 or the second device housing 202. In this illustrative embodiment, the display 114 is coupled to both the first device housing 201 and the second device housing 202 and spans the hinge 203. In other embodiments, this display 114 can be replaced by two displays, with one coupled to the first device housing 201 and another coupled to the second device housing 202. In either case, this display 114 is considered to be an "interior" display because it is concealed when the first device housing 201 and the second device housing 202 are in the closed position. Either or both of display 114 and/or display 225 can be touch sensitive.

Features can be incorporated into the first device housing 201 and/or the second device housing 202. Examples of such features include an optional camera 226, which was used as the image capture device in the method (100) of FIG. 1, or an optional speaker port 227. Each is shown disposed on the rear side of the electronic device 110 in FIG. 2, but image capture devices could be placed on the front side instead of, or in addition to, camera 226 as well. Illustrating by example, in this illustrative embodiment at least one image capture device 208 is positioned on the front side of the electronic device 110 as well. In this illustrative embodiment, an optional user interface component 228, which may be a button or touch sensitive surface, can also be disposed along the rear side of the second device housing 202.

Also illustrated in FIG. 2 is one explanatory block diagram schematic 200 of one or more components suitable for inclusion the electronic device 110. In one or more embodiments, the block diagram schematic 200 is configured as a printed circuit board assembly disposed within the first device housing 201 and/or second device housing 202 of electronic device 110. Various components can be electrically coupled together by conductors, or a bus disposed along one or more printed circuit boards. It should be noted that the block diagram schematic 200 includes many components that are optional, but which are included in an effort to demonstrate how varied electronic devices configured in accordance with embodiments of the disclosure can be.

Thus, it is to be understood that the block diagram schematic 200 of FIG. 2 is provided for illustrative purposes only and for illustrating components of one electronic device 110 in accordance with embodiments of the disclosure. The block diagram schematic 200 of FIG. 2 is not intended to be a complete schematic diagram of the various components required for an electronic device 110. Therefore, other electronic devices in accordance with embodiments of the disclosure may include various other components not shown in FIG. 2 or may include a combination of two or more components or a division of a particular component into two or more separate components, and still be within the scope of the present disclosure.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface, one example of which is the display 114, which may optionally be touch sensitive. In one embodiment, users can deliver user input to the display 114 by delivering touch input from a finger, stylus, or other objects disposed proximately with the display 114.

For electronic device 110, since the display 114 spans the hinge 203, it is configured to be flexible. For instance, in one embodiment this display 114 is configured as an organic light emitting diode (OLED) display fabricated on a flexible plastic substrate. This allows the display 114 to be flexible so as to deform when the first device housing 201 pivots about the hinge 203 relative to the second device housing 202. However, it should be noted that other types of displays would be obvious to those of ordinary skill in the art having the benefit of this disclosure. In other embodiments conventional, rigid displays can be disposed to either side of the hinge 203 rather than using a flexible display.

In one embodiment, the display 114 is configured as an active-matrix organic light emitting diode (AMOLED) display. However, it should be noted that other types of displays, including liquid crystal displays, would be obvious to those of ordinary skill in the art having the benefit of this disclosure.

In one embodiment, the electronic device 110 includes one or more processors 205. In one embodiment, the one or more processors 205 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 200. Each of the application processor and the auxiliary processor(s) can be configured to process and execute executable software code to perform the various functions of the electronic device 110 with which the block diagram schematic 200 operates. A storage device, such as memory 206, can optionally store the executable software code used by the one or more processors 205 during operation.

In this illustrative embodiment, the block diagram schematic 200 also includes a communication device 207 that can be configured for wired or wireless communication with one or more other devices or networks. The networks can include a wide area network, a local area network, and/or personal area network. The communication device 207 may also utilize wireless technology for communication, such as, but are not limited to, peer-to-peer or ad hoc communications such as HomeRF, Bluetooth and IEEE 802.11, and other forms of wireless communication such as infrared technology. The communication device 207 can include wireless communication circuitry, one of a receiver, a transmitter, or transceiver, and one or more antennas.

In one embodiment, the one or more processors 205 can be responsible for performing the primary functions of the electronic device with which the block diagram schematic 200 is operational. For example, in one embodiment the one or more processors 205 comprise one or more circuits operable with the user interface to present presentation information to a user. This information can include images and/or video captured by one or more image capture devices 208 of the electronic device 110. Additionally, the one or more processors 205 can be operable with an audio output device 209 to deliver audio output to a user. The executable software code used by the one or more processors 205 can be configured as one or more modules that are operable with the one or more processors 205. Such modules can store instructions, control algorithms, and so forth.

In one or more embodiments, the block diagram schematic 200 includes an audio input/processor 211. The audio input/processor 211 can include hardware, executable code, and speech monitor executable code in one embodiment. The audio input/processor 211 can include, stored in memory 206, basic speech models, trained speech models, or other modules that are used by the audio input/processor 211 to receive and identify voice commands that are received with audio input captured by an audio input device. In one embodiment, the audio input/processor 211 can include a voice recognition engine. Regardless of the specific implementation utilized in the various embodiments, the audio input/processor 211 can access various speech models to identify speech commands in one or more embodiments.

The audio input/processor 211 is operable as an audio capture device to receive and capture audio input from a source, such as a person, authorized user, plurality of persons within an environment 212 about the electronic device 110. The audio input/processor 211 can include hardware, executable code, and speech monitor executable code in one embodiment. The audio input/processor 211 can be operable with one or more predefined authentication references stored in memory 206. In one or more embodiments, the audio input/processor 211 can receive and identify voice commands that are received with audio input captured by an audio input device. In one embodiment, the audio input/processor 211 can include a voice recognition engine. Regardless of the specific implementation utilized in the various embodiments, the audio input/processor 211 can access various speech models stored with the predefined authentication references to identify speech commands.

In one embodiment, the audio input/processor 211 is configured to implement a voice control feature that allows the electronic device 110 to function as a voice assistant device, which may be configured as a voice assistant engine. In one or more embodiments, the voice assistant engine is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can cause the emanation of the audio input from their mouth to cause the one or more processors 205 of the electronic device 110 to execute a control operation.

Various sensors 213 can be operable with the one or more processors 205. A first example of a sensor that can be included with the various sensors 213 is a touch sensor. The electronic device 110 can include one or more touch sensors, each of which can include a capacitive touch sensor, an infrared touch sensor, resistive touch sensors, or another touch-sensitive technology.

Another example of a sensor 213 is a geo-locator that serves as a location detector 214. In one embodiment, location detector determines location data of the electronic device 110. Location can be determined by capturing the location data from a constellation of one or more earth orbiting satellites, or from a network of terrestrial base stations to determine an approximate location. The location detector may also be able to determine location by locating or triangulating terrestrial base stations of a traditional cellular network, such as a CDMA network or GSM network, or from other local area networks, such as Wi-Fi networks.

Another example of a sensor 213 suitable for inclusion with the electronic device 110 include one or more motion sensors that are operable to determine an orientation and/or movement of the electronic device 110 in three-dimensional space. Illustrating by example, the one or more motion sensors can include an accelerometer, gyroscopes, or other device to detect device orientation and/or motion of the electronic device 110.

Another example of a sensor 213 is a force sensor. Where included, the force sensor can take various forms. For example, in one embodiment, the force sensor comprises resistive switches or a force switch array configured to detect contact with either the display or the housing of an electronic device. In another embodiment, the force sensor can be capacitive. In yet another embodiment, piezoelectric sensors can be configured to sense force as well.

An image processing system 216 can be included in the electronic device 110 and can be operable with the one or more processors 205. The image processing system 216 can be operable with one or more image capture devices 208 and can process image sensor data 222 from the one or more image capture device 208. The image processing system 216 can be operable with a bokeh effects engine 219, a gain calculation/saturation increasing engine 204, a channel upscaler/downscaler 224, and a saturated pixel manager 210 to create a simulated bokeh effect in the image sensor data 222 received from the one or more image capture devices 208.

In one or more embodiments, the one or more processors 205 can define one or more process engines. Examples of these process engines include the bokeh effects engine 219, the gain calculation/saturation increasing engine 204, the channel upscaler/downscaler 224, and the saturated pixel manager 210. Each process engine can be a component of the one or more processors 205, operable with the one or more processors 205, defined by the one or more processors 205, and/or integrated into the one or more processors 205. Other configurations for these process engines, including as software or firmware modules operable on the one or more processors 205, will be obvious to those of ordinary skill in the art having the benefit of this disclosure.

Illustrating by example, in one or more embodiments the saturated pixel manager 210 is operable to select saturated pixels of the image sensor data 222. The gain calculation/saturation increasing engine 204 can determine a gain factor as a function of brightness values of pixels in the image sensor data 222. The gain calculation/saturation increasing engine 204 can then increase an intensity value of the saturated pixels by the gain factor to create scaled image sensor data 229.

The bokeh effects engine 219 can then blur at least some of the scaled image sensor data 229 by convolving a blur kernel with the scaled image sensor data 229 to create altered image sensor data 230. In one or more embodiments, the bokeh effects engine 219 blurs at least some of the scaled image sensor data 229 by convolving a CIRC function with the scaled image sensor data 229. The one or more processors 205 can then cause the display 114 to present the altered image sensor data 230 exhibiting the simulated bokeh effect.

In one or more embodiments, to make the process faster the channel upscaler/downscaler 224 can downscale the luma channel of the image sensor data 222 before the gain calculation/saturation increasing engine 204 increases the intensity value of the saturated pixels by the gain factor. The saturated pixel manager 210 can select the saturated pixels by determining which pixels of the image sensor data 222 have a luma value that is greater than a predefined minimum luma value threshold. The saturated pixel manager 210 can also determine an average brightness value by creating a summed area table for the predetermined number of pixels surrounding, and including, each saturated pixel selected by the saturated pixel manager 210. In one or more embodiments, after the bokeh effects engine 219 blurs at least some of the image sensor data 222 by convolution, the channel upscaler/downscaler 224 can upscale the luma channel of the altered image sensor data 230. The bokeh effects engine 219 can then blur at least some other of the image sensor data 222 by creating other summed area tables for the blue projection channel of the altered image sensor data 230 and a red projection channel of the altered image sensor data 230 and applying a box filter to the other summed area tables. Examples of each of these operations are illustrated in more detail in the figures that follow. However, in so doing the simulated bokeh effect is applied so quickly that the one or more processors 205 can present the altered image sensor data 230 on the display 114 while the one or more image capture devices 221,226 operate in a preview or viewfinder mode of operation.

Other process engines can be included in the electronic device 110 as well. For instance, a context engine 223 can be operable with the various sensors to detect, infer, capture, and otherwise detect external conditions occurring within the environment 212 of the electronic device 110. Where included, one embodiment of the context engine 223 determines assessed contexts and frameworks using adjustable algorithms of context assessment employing information, data, and events. These assessments may be learned through repetitive data analysis. Alternatively, a user may employ the user interface to enter various parameters, constructs, rules, and/or paradigms that instruct or otherwise guide the context engine 223. The context engine 223 can comprise an artificial neural network or other similar technology in one or more embodiments. The various process engines can optionally operate in conjunction with the artificial intelligence engine 240 as well.

In one or more embodiments, each process engine is operable with the one or more processors 205. In some embodiments, the one or more processors 205 can control the various process engines. In other embodiments, each process engine can operate independently, delivering information to the one or more processors 205. The process engines can each receive data from the various sensors 213. In one or more embodiments, the one or more processors 205 are configured to perform the operations of the process engines.

When executing operations such as those method steps described above with reference to FIG. 1, in one or more embodiments the one or more processors 205 receive, from an image sensor of an image capture device 208, image sensor data 222. The one or more processors 205 increase an intensity value of saturated pixels by a gain factor determined as a function of brightness values of pixels in the image sensor data. The one or more processors 205 can blur also of the image sensor data 222 by convolving a blur kernel having a predefined shape with the image sensor data 222 to create altered image sensor data 230 exhibiting a bokeh effect. The one or more processors 205 can then present the altered image sensor data 230 on a user interface of the electronic device 110, examples of which include display 114 and display 225.

In one embodiment, the one or more image capture devices 208 comprise a two-dimensional image capture device, such as that illustrated by camera 226. In one or more embodiments, the camera 226 comprises a two-dimensional Red-Green-Blue (RGB) image capture device. The one or more image capture devices 208 can also include an infrared image capture device. Other types of image capture devices suitable for inclusion with the one or more image capture devices 208 will be obvious to those of ordinary skill in the art having the benefit of this disclosure.

Other components 218 operable with the one or more processors 205 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers, the ultrasound transducers (where included), or other alarms and/or buzzers. The other components 218 can also include a mechanical output component such as vibrating or motion-based mechanisms.

The other components 218 can optionally include a barometer operable to sense changes in air pressure due to elevation changes or differing pressures of the electronic device 110. The other components 218 can also optionally include a light sensor 220 that detects changes in optical intensity, color, light, or shadow. In one or more embodiments, the light sensor 220 is operable to determine whether the environment 212 of the electronic device 110 is a low-light environment, one example of which occurs when the light density within the environment 212 is less than one hundred lux.

It is to be understood that FIG. 2 is provided for illustrative purposes only and for illustrating components of one electronic device 110 in accordance with embodiments of the disclosure and is not intended to be a complete schematic diagram of the various components required for an electronic device. Therefore, other electronic devices in accordance with embodiments of the disclosure may include various other components not shown in FIG. 2 or may include a combination of two or more components or a division of a particular component into two or more separate components, and still be within the scope of the present disclosure.

Figure 5:
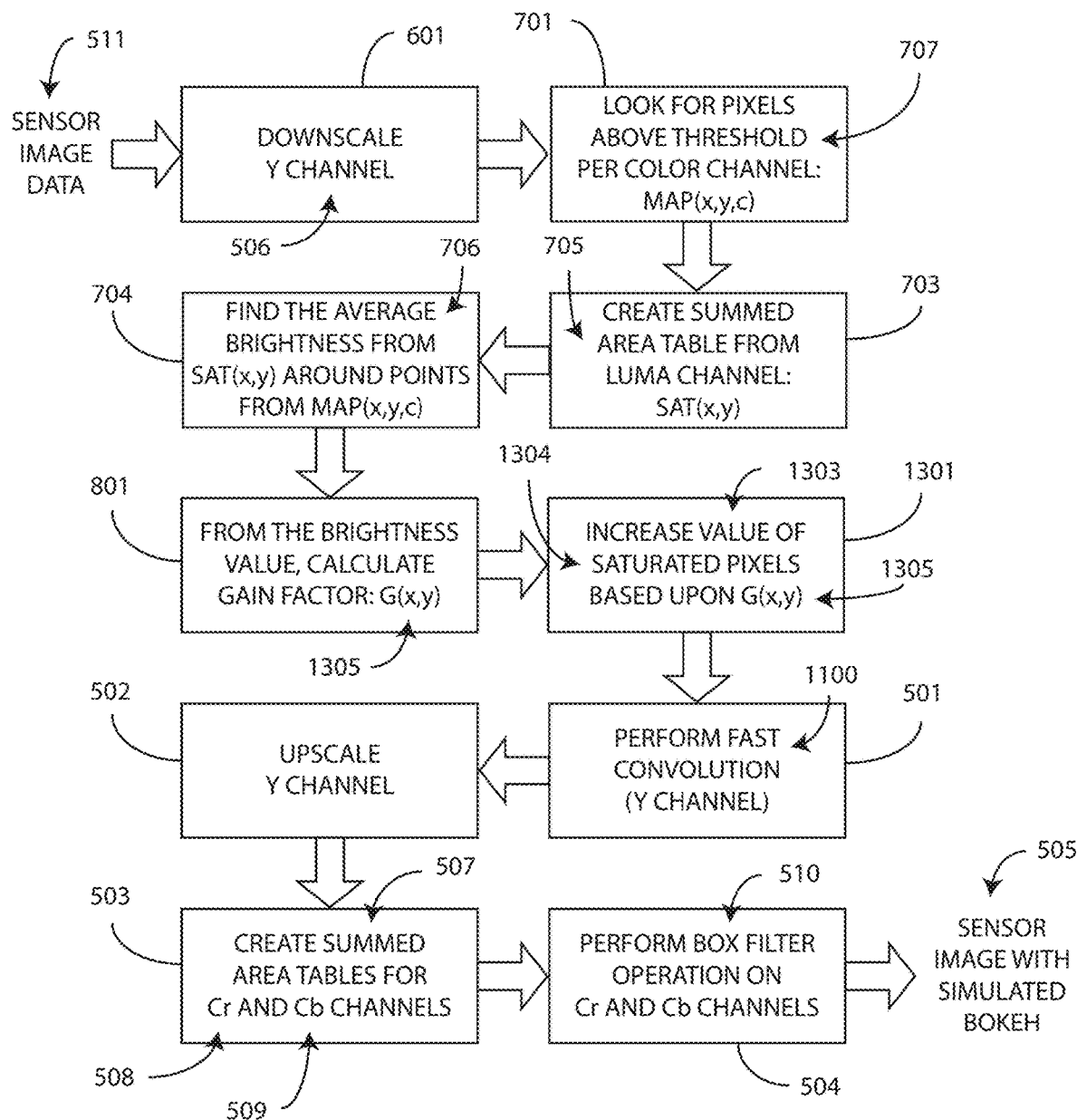
FIG. 5 illustrates one explanatory method for simulating bokeh in accordance with one or more embodiments of the disclosure.

Turning now to FIG. 5, illustrated therein is one explanatory method 500 for performing a quick and efficient simulated bokeh effect in portable electronic devices. The method performs a convolution using a blur kernel having a predefined shape with image sensor data to create altered image sensor data exhibiting a simulated bokeh effect. In one or more embodiments, the predefined shape is provided by a CIRC function uses in the convolution. The convolution provides a blur that better matches the bokeh that is applied optically. While a CIRC function is used in an explanatory embodiment, in other embodiments the predefined shape takes other forms. Illustrating by example, the predefined shape can be a pixelated heart, a pixelated star, a pixelated snowflake, a pixelated polygonal shape, a pixelated freeform shape, or another shape.

The method 500 also increases saturated regions to produce projections of the predefined shape, which can be configured as a projection of a lens aperture of an image capture device in one or more embodiments, around highlights found in the image sensor data. The method 500 can be fully automated in an electronic device and is fast enough to be used even when the image capture device is operating in a viewfinder mode of operation.

Embodiments of the disclosure contemplate that many prior art algorithms use a Gaussian function to create blur because it is computationally easy and is fast. A Gaussian function is a separable function in the X and Y dimension. Accordingly, it can be implemented using two finite impulse response (FIR) filters, with one FIR filter working in the X direction and another working in the Y direction. For a blur kernel using a Gaussian function having dimensions of N x N pixels, the number of operations is proportional to 2*N rather than N*N, which would be the case if a proper convolution were performed instead of using the two FIR filters.

The problem with using Gaussian blur is that the shape of the Gaussian function fails to create a perceived projection of the lens aperture. This is true because the Gaussian function resembles a contoured cone in three-dimensional space, with gain near the center of the cone being greater than gain near the edge of the cone.

Figure 10:
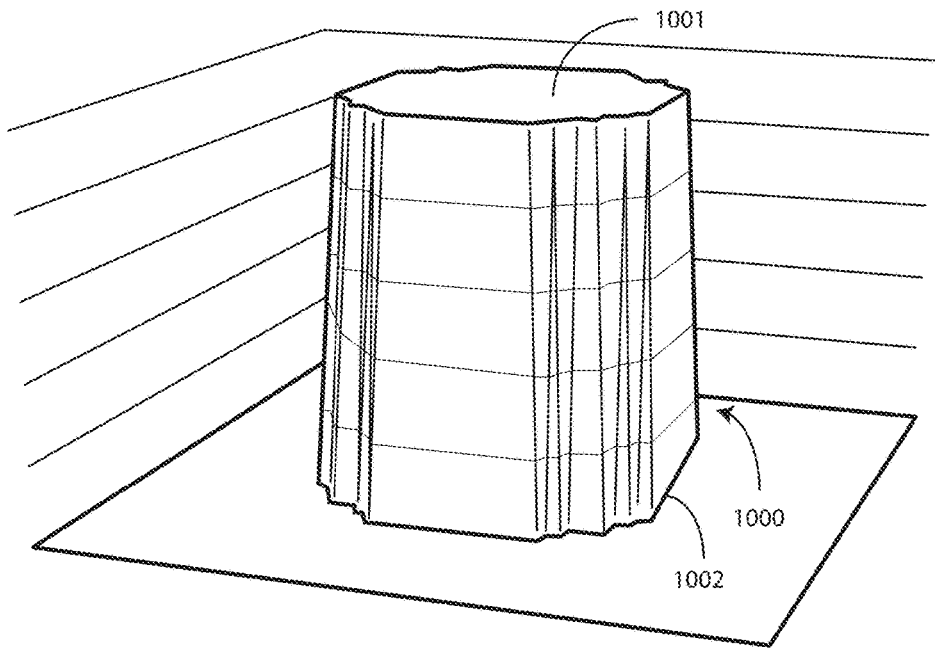
FIG. 10 illustrates one explanatory CIRC function in accordance with one or more embodiments of the disclosure.

Advantageously, embodiments of the disclosure use a CIRC function. Turning briefly to FIG. 10, illustrated therein is one explanatory CIRC function 1000. As shown, the base 1002 of the CIRC function 1000 is a pixelated circle, which resembles a projection of a lens aperture of an image capture device on a digital image sensor. Moreover, the CIRC function has a gain 1001 that is equal across the predefined shape of this blur kernel in three-dimensional space. The CIRC function 1000 is thus better and representing the projection of a lens aperture than does the Gaussian function.

Turning now back to FIG. 5, one problem with a CIRC function (1000) is that it can be slow when implemented in a portable electronic device because, when having a dimension of N pixels by N pixels, convolving the CIRC function (1000) with image sensor data 511 requires a number of calculations that is proportional to N*N operations. This is typically much slower than the number of calculations that is proportional to 2*N operations when the Gaussian function is used.

Figure 11:
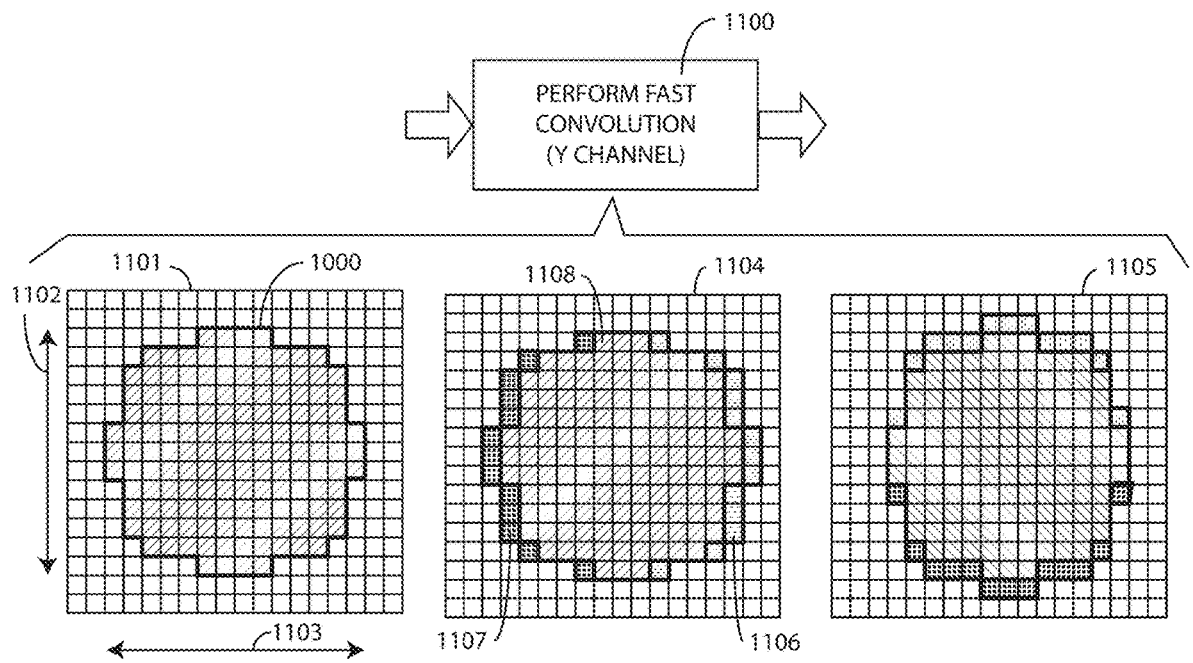
FIG. 11 illustrates one or more method steps in accordance with one or more embodiments of the disclosure.

Advantageously, embodiments of the disclosure contemplate that the process of convolving a blur kernel with image sensor data 511 requires moving the blur kernel around the image and multiplying pixel values with blur kernel values on a pixel-by-pixel basis. Embodiments of the disclosure also contemplate that this process results in many, many repeated calculations. Advantageously, embodiments of the disclosure provide a process that avoids these repeated calculations. This "hack" results in a convolution with a CIRC function (1000) that is as fast as using two FIR filters with a Gaussian blur kernel. In one or more embodiments, when the CIRC function (1000) has dimensions of N pixels by N pixels, the blurring using the CIRC function (1000) in a convolution comprises performing a quick convolution consisting of a number of product operations proportional to 2*N and less than N*N. Turning briefly to FIG. 11, illustrated therein is a graphical representation of how this is done.

As shown in FIG. 11, a portion 1101 of image sensor data (511) is shown being convolved with a CIRC function 1000 using a fast convolution 1100. The CIRC Function 1000 has dimensions 1102,1103 of N pixels by N pixels.

As shown in FIG. 11, the fast convolution 1100 comprises translating the predefined shape defined by the CIRC function 1000 across the image sensor data (511). In this illustrative example, the CIRC function 1000 initially translates to the right at portion 1104, and then translates down at portion 1105. This is merely for explanatory purposes. When the full fast convolution 1100 is performed, the blur kernel defined by the CIRC function 1000 will translate across all pixels of the image sensor data (511).

As the blur kernel defined by the CIRC function 1000 moves to the right, for example, new pixels 1106 fall within the CIRC function 1000, while old pixels 1107 fall out of the CIRC function 1000. Meanwhile, many pixels 1108 remain within the CIRC function 1000. The same thing happens when the CIRC function 1000 moves downward, as shown at portion 1105.

In one or more embodiments, the convolution performed by the fast convolution 1100 comprises adding convolution product values for a first set of pixels 1106 entering the predefined shape defined by the CIRC function 1000 when the blur kernel translates, subtracting convolution product values for a second set of pixels 1107 exiting the predefined shape defined by the CIRC function 1000 when the blur kernel translates. Moreover, in one or more embodiments the convolution performed by the fast convolution 1100 occurs without recalculating product values of a third set of pixels 1108 remaining within the predefined shape defined by the CIRC function 1000 when the blur kernel translates. This greatly expedites the time for blurring the image sensor data (511) and reduces the number of computations sufficiently that the blurring process can be used even for viewfinder modes of operation.

Figure 18:
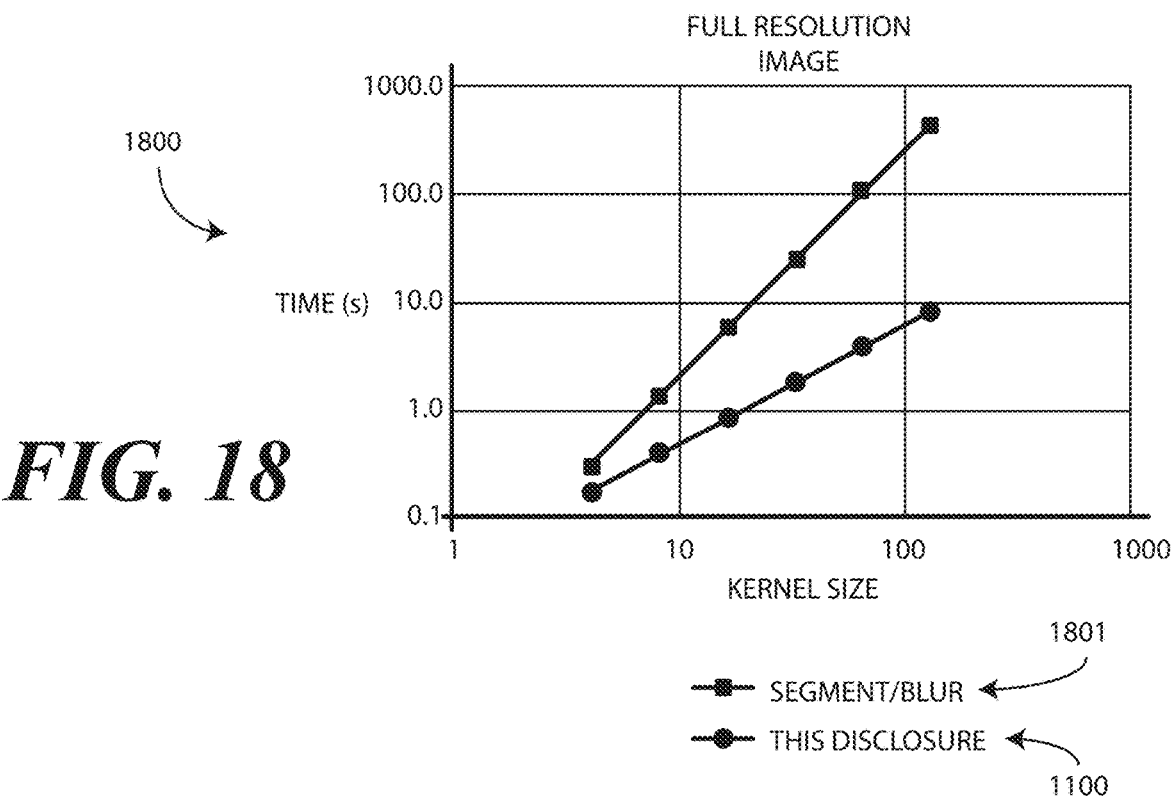
FIG. 18 illustrates a comparison of processing speed of one or more methods in accordance with embodiments of the disclosure with prior art methods.
Figure 19:
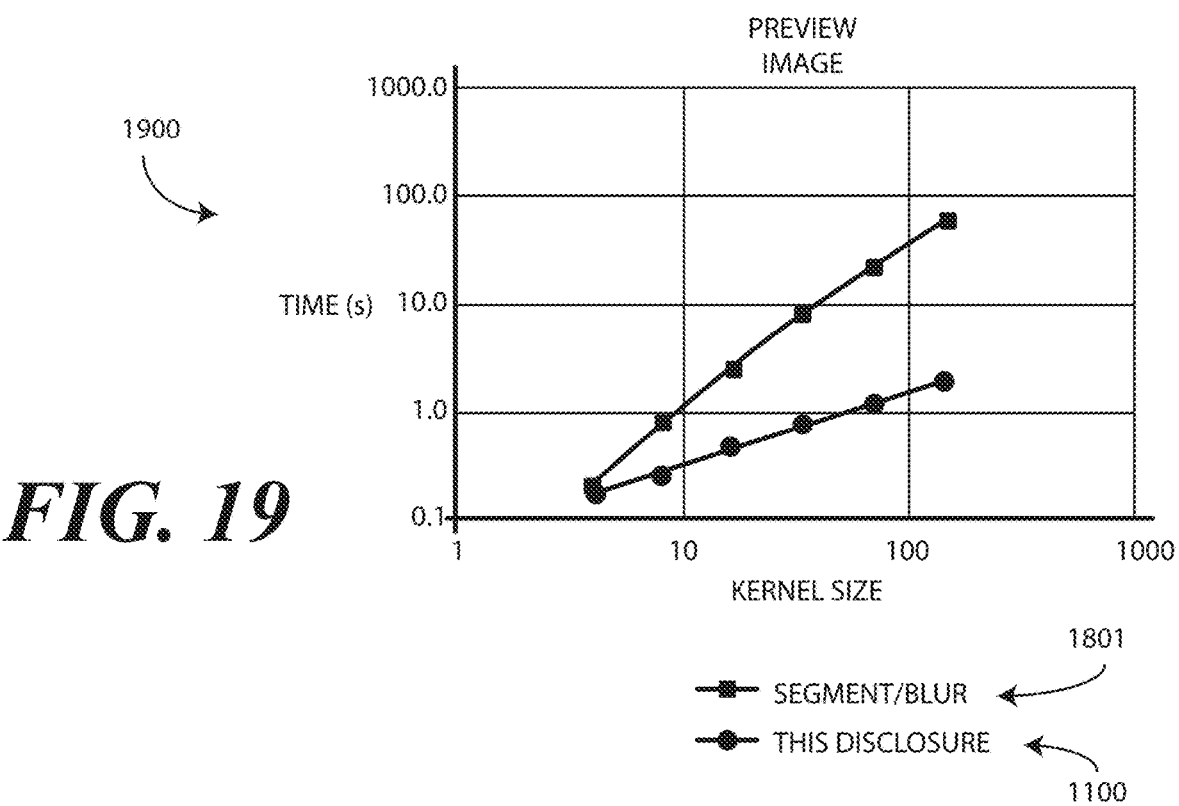
FIG. 19 illustrates another comparison of processing speed of one or more methods in accordance with embodiments of the disclosure with prior art methods.

This increase in speed is shown in FIGS. 18-19. Turning now to FIGS. 18-19, illustrated therein are two graphs 1800,1900 comparing the speed of the prior art segment and blur method 1801 described above with reference to FIG. 4 and the fast convolution 1100 of FIG. 11. The graph 1800 of FIG. 18 shows the speed comparison on a full resolution image, while the graph 1900 of FIG. 19 shows the speed comparison on a preview image when the image capture device is operating in a viewfinder mode of operation. As can be seen by reviewing these two graphs, the speed of the fast convolution 1100 is orders of magnitude faster than the prior art segment and blur method 1801.

Figure 12:
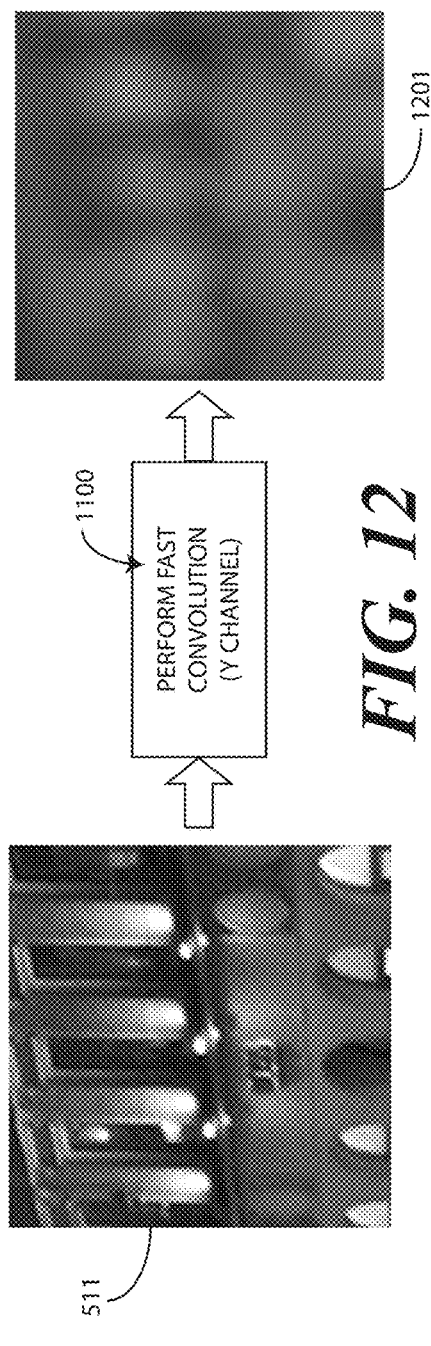
FIG. 12 illustrates one or more method steps in accordance with one or more embodiments of the disclosure.

Embodiments of the disclosure contemplate that blurring with the CIRC function (1000) alone will not necessarily give the desired bokeh effect around highlights or light sources of the image sensor data (511). Turning briefly to FIG. 12, illustrated therein is why.

As shown in FIG. 12, image sensor data 511 is blurred using the fast convolution 1100 of FIG. 11. In one or more embodiments, the blurring performed in FIG. 12 by the fast convolution 1100 comprises convolving a blur kernel having a predefined shape with the image sensor data 411 to create altered image sensor data 1201 exhibiting a simulated bokeh effect. As shown in the altered image sensor data 1201, the highlights and light sources are quite blurry and do not necessarily have the optimal bokeh effect compared to the same effect when performed optically. This occurs because in a captured image data the blurred regions of the altered image sensor data 1201 have been clipped. This results in information being lost from the image sensor data 511.

Figure 13:
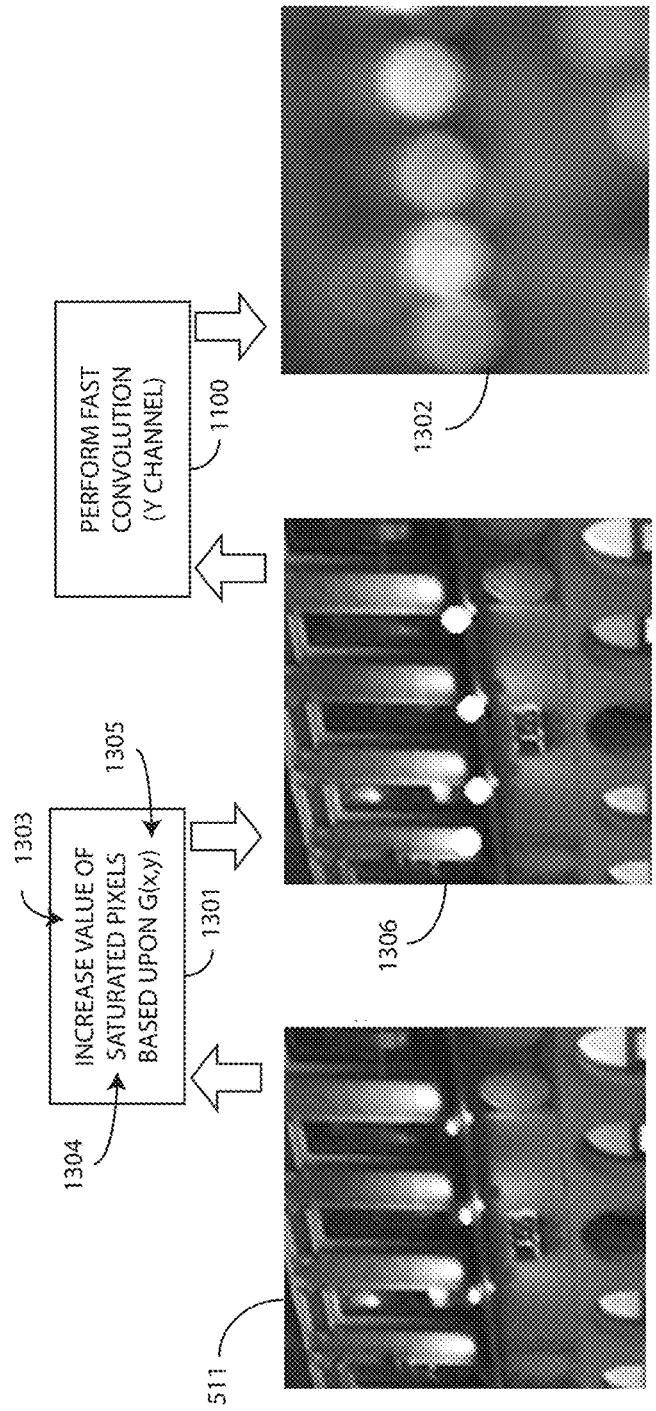
FIG. 13 illustrates one or more method steps in accordance with one or more embodiments of the disclosure.

Accordingly, embodiments of the disclosure contemplate that it is advantageous to increase the intensity of the saturated regions of the image sensor data 511 before the fast convolution 1100 using the CIRC function (1000) is performed. FIG. 13 illustrates how this can be accomplished.

As shown in FIG. 13, image sensor data 511 from an image capture device is received by one or more processors of an electronic device. At step 1301, the one or more processors of the electronic device increase an intensity value 1303 of saturated pixels 1304 as a function of a gain factor 1305 determined as a function of brightness values of pixels in the image sensor data 511. The result 1306 has lights and other highlights amplified in the image sensor data 511. When the fast convolution 1100 is then performed after the intensity value 1303 of the saturated pixels 1304 has been increased by the gain factor 1305, the altered image sensor data 1302 provides a much more pleasing bokeh effect compared to the altered image sensor data (1201) when the intensity value increase is omitted.

Figure 9:
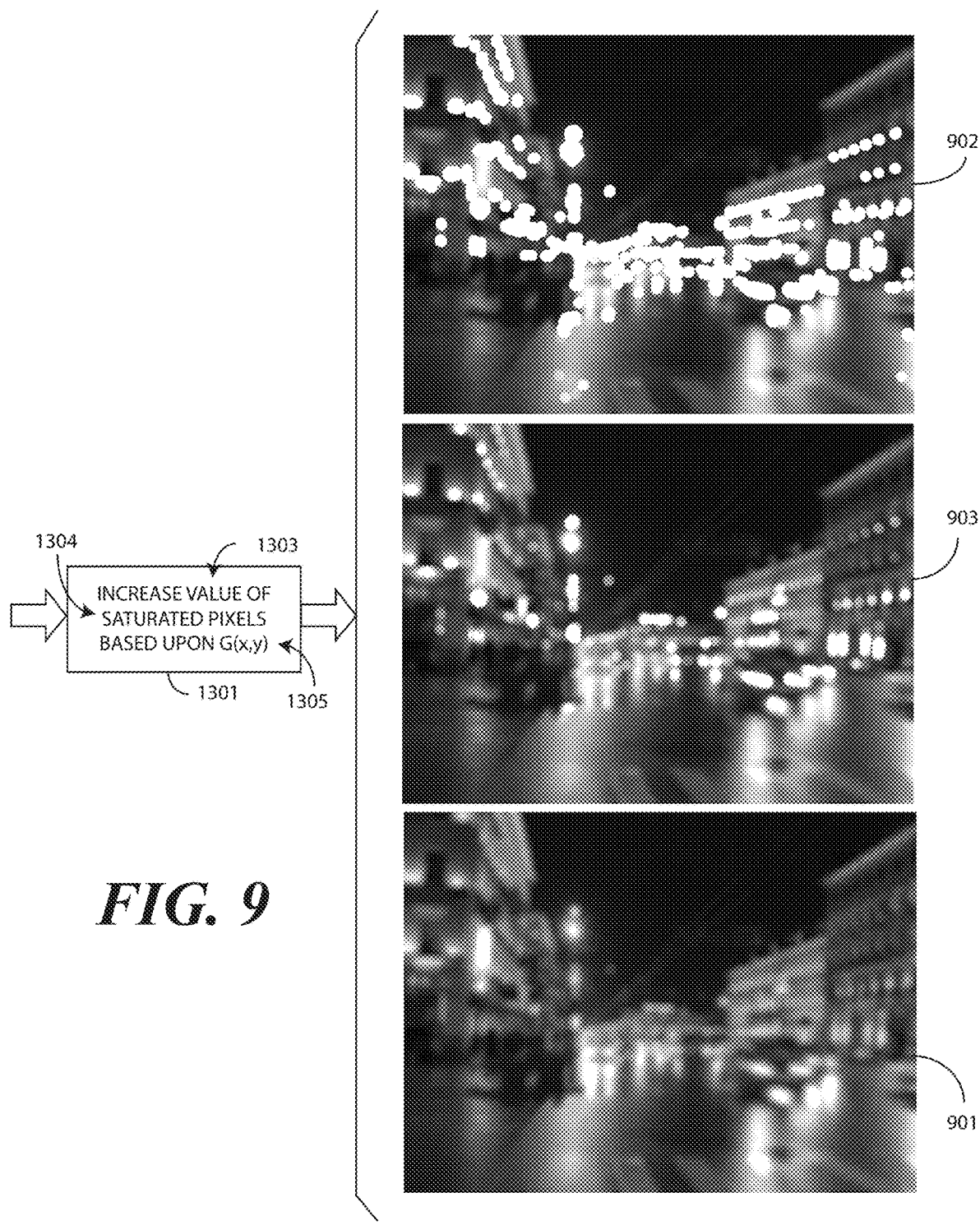
FIG. 9 illustrates one or more method steps in accordance with one or more embodiments of the disclosure.

Embodiments of the disclosure contemplate that for the saturated pixels 1304, information has been lost from the original image sensor data 511. For this reason, a guess must be made for the gain factor 1305. Increasing the intensity value 1303 too much will not look pleasing, while increasing the intensity value 1303 too little will not provide a suitable bokeh effect. Turning now to FIG. 9, an example of this is illustrated.

As with FIG. 13, in FIG. 9 at step 1301 the one or more processors of the electronic device increase an intensity value 1303 of saturated pixels 1304 as a function of a gain factor 1305 determined as a function of brightness values of pixels in the image sensor data 511. In altered image sensor data 901, the gain factor 1305 is too low. Consequently, the bokeh effect that results is suboptimal. Similarly, in altered image sensor data 902, the gain factor 1305 is too high. The result is harsh saturated pixels 1304, which is less than pleasing to the eye.

By contrast, at altered image sensor data 903, the gain factor 1305 is just right. This "goldilocks" setting for the gain factor 1305 results in altered image sensor data 903 having a pleasing and desirable bokeh effect. The question thus becomes how to automatically increase the intensity value 1303 of the saturated pixels 1304.

Figure 7:
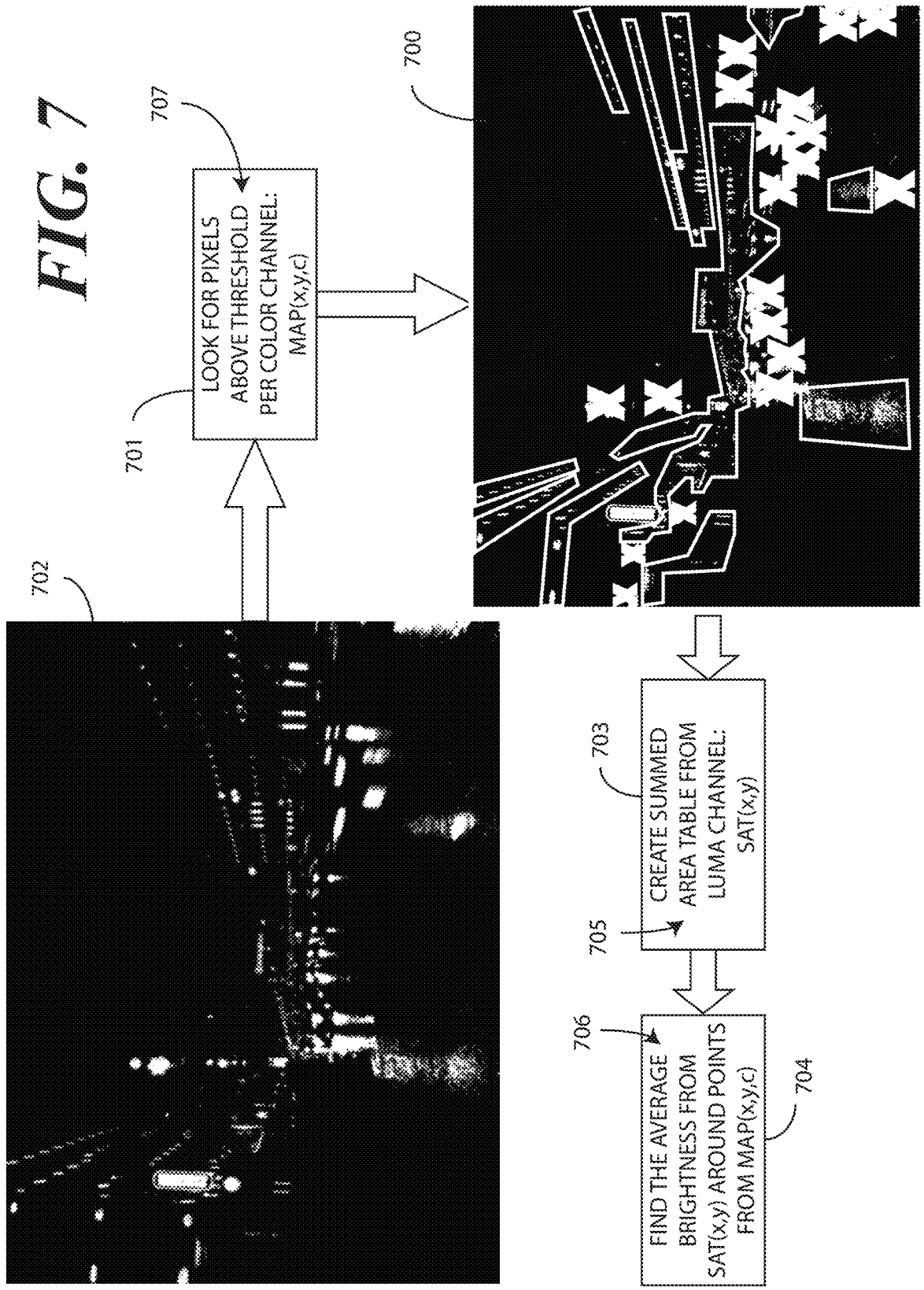
FIG. 7 illustrates one or more method steps in accordance with one or more embodiments of the disclosure.

In one or more embodiments, embodiments of the disclosure first make a map of all the saturated pixels 1304. Turning now to FIG. 7, illustrated therein are one or more method steps demonstrating how this can be accomplished. Starting with the map 702 made from the image sensor data (511), at step 701 one or more processors of an electronic device determining which pixels of the image sensor data (511) have a luma value that is greater than a predefined minimum luma value threshold 707. Empirically a threshold of 248 (on an 8-bit scale) provides good results. The result 700 is shown with selections being made from the map 702 when pixels of the image sensor data (511) have a luma value that is greater than a predefined minimum luma value threshold 707.

In one or more embodiments, step 701 also includes omitting pixels having luma values greater than a predefined maximum luma value threshold. Embodiments of the disclosure contemplate that when pixels are sufficiently bright, adding gain is unnecessary and can result in some harshness resulting in the bokeh effect. The result 700 shows regions outlined by white boxes where the intensity value (1303) of saturated pixels (1304) as a function of a gain factor (1305) determined as a function of the brightness values of the pixels in the image sensor data (511). The result 700 also includes other regions represented by white X marks that will not have their brightness values increased because they are sufficiently bright already.

At steps 703,704, the one or more processors of the electronic device determine the average brightness value for a predetermined number of pixels surrounding, and including, each saturated pixel of the image sensor data 511. In one or more embodiments, the predetermined number of pixels surrounding, and including, each saturated pixel is less than a predefined maximum saturated pixel count threshold.

To be as fast as possible, in one or more embodiments a summed area table 705 is used at step 703 to find the average brightness value 706 at step 704. Moreover, in one or more embodiments a single luma channel is used at steps 703,704 rather than all three color channels.

Figure 8:
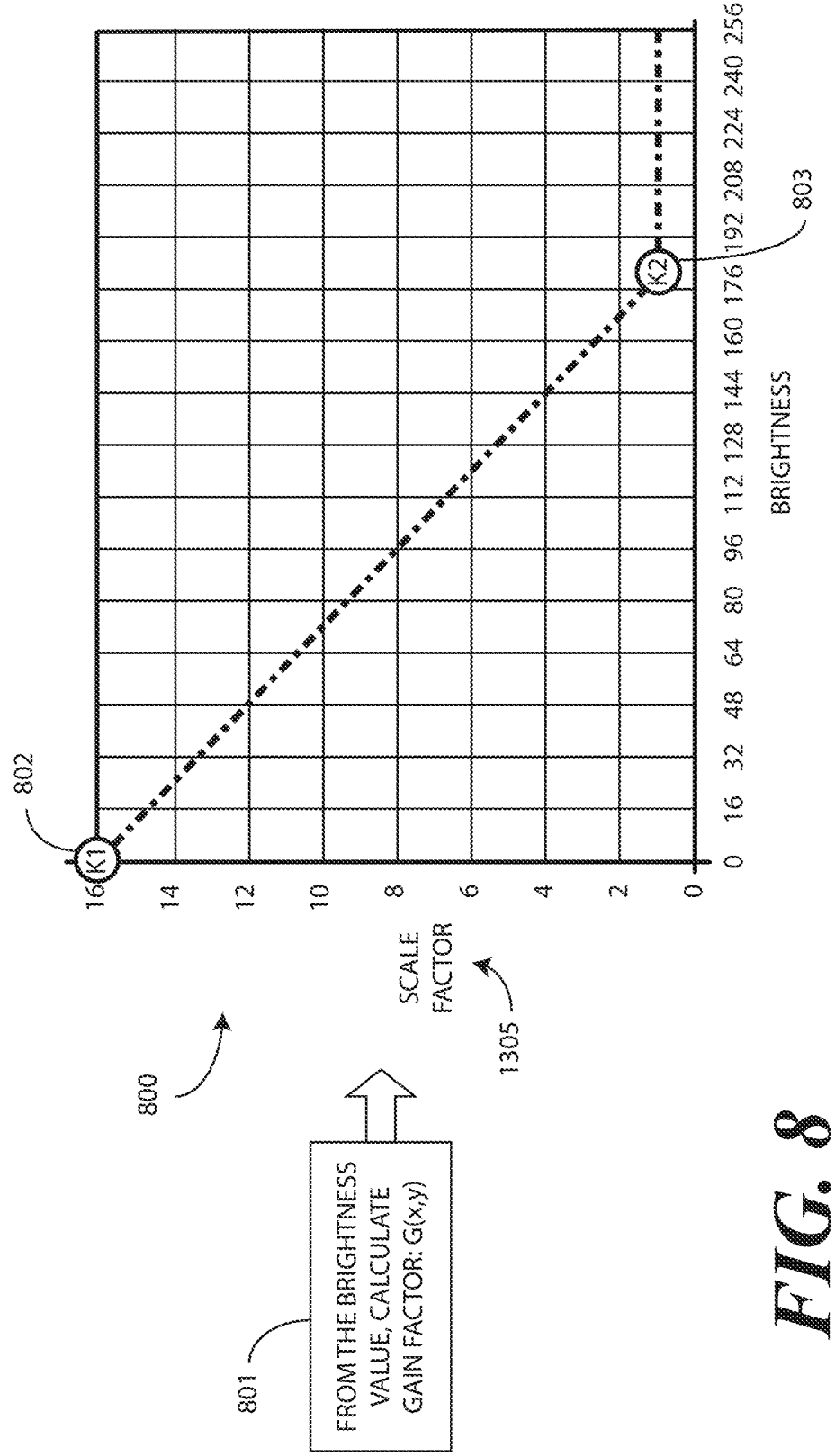
FIG. 8 illustrates one explanatory scale factor determination chart in accordance with one or more embodiments of the disclosure.

Turning now to FIG. 8, at step 801 the one or more processors of the electronic device determine the gain factor 1305 that will be used to increase the saturated regions from the map (702) of FIG. 7. As shown in the graph 800 of FIG. 8, in one or more embodiments, the gain factor 1305 is greater than or equal to one for saturated pixels (1304).

In one or more embodiments, the gain factor 1305 represented in the graph 800 has a formula of $G = K1*Bv + K3$, where:

G represents the gain factor 1305:

Bv represents a brightness value associated with the saturated pixels (1304);

K1 802 and K3 803 are tunable constants: and when G is less than one, G is defined to be one.

As noted above, in one or more embodiments where Bv represents an average brightness value for a predefined number of pixels surrounding, and including, each saturated pixel (1304).

Figure 28:
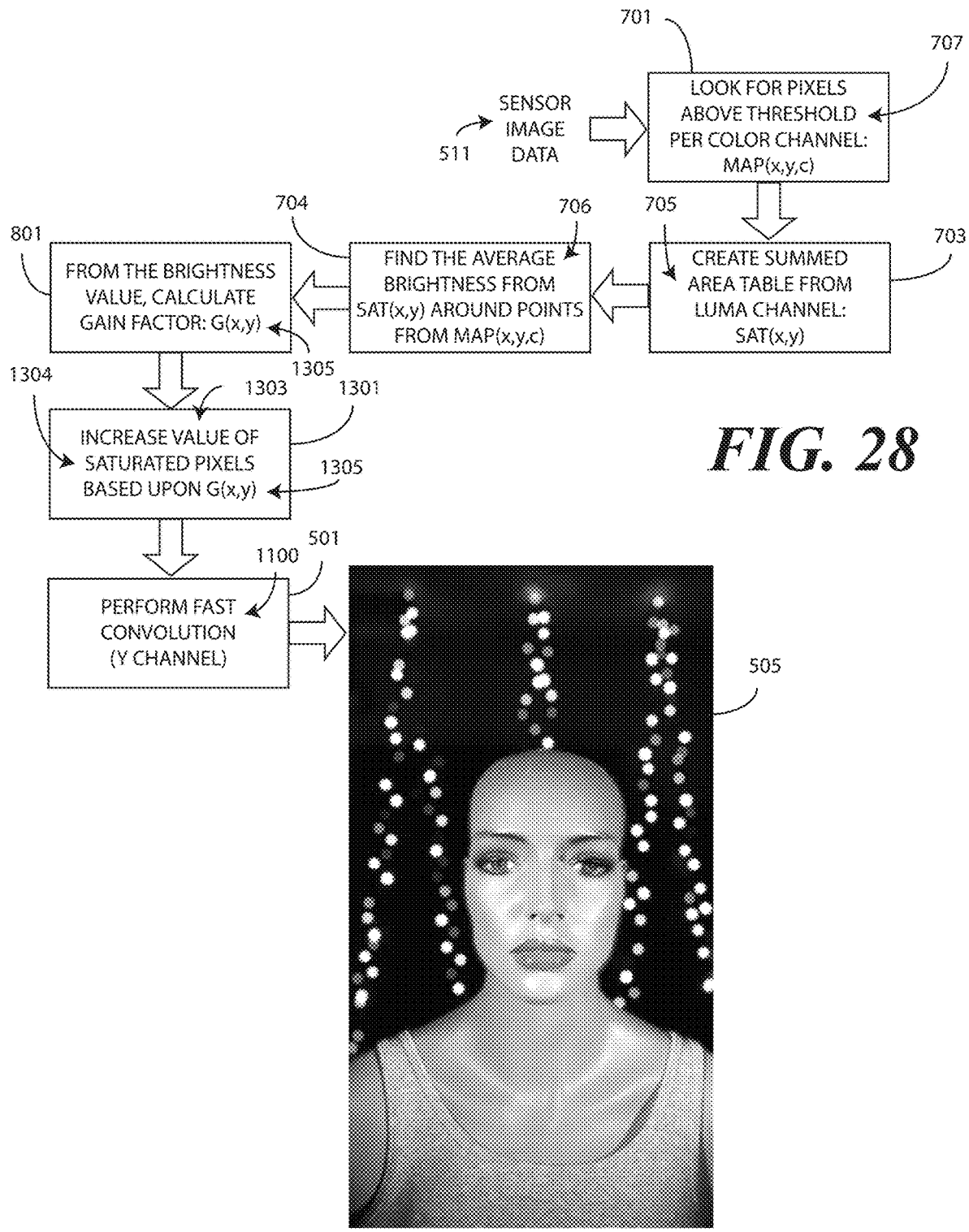
FIG. 28 illustrates one or more method steps in accordance with one or more embodiments of the disclosure.

Using the steps described so far, beautiful bokeh effects can be achieved. Illustrating by example, turning now to FIG. 28, illustrated therein is one example of the rich and wonderful bokeh effect that can be achieved using only the steps described to this point. In particular, when image sensor data 511 is received by one or more processors from an image sensor of an image capture device, the one or more processors select saturated pixels 1304 by determining which pixels of the image sensor data 411 have a luma value greater than a predefined minimum luma value threshold 707 at step 701.

At steps 703,704, the one or more processors of the electronic device determine the average brightness value for a predetermined number of pixels surrounding, and including, each saturated pixel of the image sensor data 511. In one or more embodiments, the predetermined number of pixels surrounding, and including, each saturated pixel is less than a predefined maximum saturated pixel count threshold.

To increase speed, in one or more embodiments a summed area table 705 is used at step 703 to find the average brightness value 706 at step 704. Moreover, in one or more embodiments a single luma channel is used at steps 703,704 rather than all three color channels. In one or more embodiments, step 704 comprises determining the average brightness value 706 by creating a summed area table 705 for the predefined number of pixels surrounding, and including, each saturated pixel.

At step 801, the gain factor 1305 is determined as described above with reference to FIG. 8. At step 1301, the one or more processors increase an intensity value 1303 of saturated pixels 1304 by the gain factor 1305, which is determined as a function of brightness values of pixels in the image sensor data 511.

At step 501, the one or more processors blur at least some of the image sensor data 511 by convolving a blur kernel having a predefined shape with the image sensor data 511 to create altered image sensor data 505 simulating a bokeh effect. In one or more embodiments, this step 501 comprises performing a fast convolution 1100 where a CIRC function (1000) translates across the image sensor data 511. In one or more embodiments, the fast convolution 1100 comprises adding convolution product values for a first set of pixels (1106) entering the predefined shape defined by the CIRC function (1000) when the blur kernel translates, subtracting convolution product values for a second set of pixels (1107) exiting the predefined shape defined by the CIRC function (1000) when the blur kernel translates, and without recalculating product values of a third set of pixels (1108) remaining within the predefined shape defined by the CIRC function (1000) when the blur kernel translates. This greatly expedites the time for blurring the image sensor data 511 and reduces the number of computations sufficiently that the blurring process can be used even for viewfinder modes of operation.

As shown, the altered image sensor data 505 simulates a beautiful bokeh effect with the lights behind the model being blurred into soft, round circles resembling the projection of a lens aperture of the image capture device. Thus, the method steps of FIG. 28 can be used to generate lovely images with a wonderful bokeh effect in electronic devices.

However, embodiments of the disclosure contemplate that it can be advantageous for the method steps to run even faster. Such is the case when using the method steps in a preview mode of operation or a viewfinder mode of operation. Accordingly, to even further increase speed, and especially when viewfinder mode of operation is being used, the method steps described to this point need to run even faster.

Figure 6:
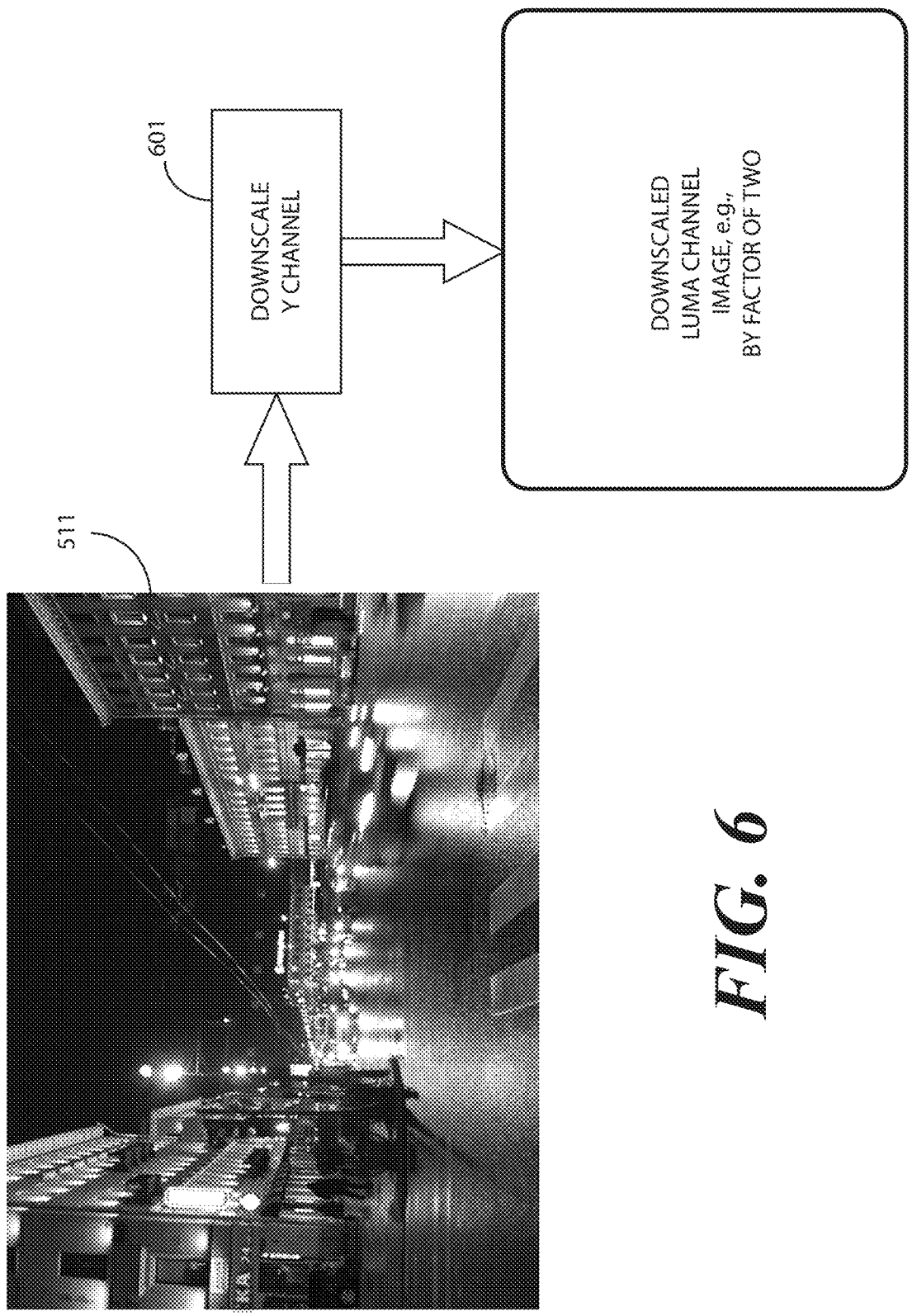
FIG. 6 illustrates one or more method steps in accordance with one or more embodiments of the disclosure.

Embodiments of the disclosure contemplate that this can be accomplished in two different ways: First, the luma channel can be downscaled. Turning briefly to FIG. 6, illustrated therein is the result of performing such a step 601. If the image sensor data 511 and blur kernel are both downscaled by a factor of two at step 601, this will increase the speed of the fast convolution (1100) by approximately a factor of eight. At the same time, the difference in overall image quality is negligibly perceptible.

Second, if the blurring is applied to just the blue projection channel and the red projection channel using a summed area table, which can be applied using a box filter, the process becomes even faster. A box filter using a summed area table is very fast, on the order of a factor of thirty times faster. Moreover, even though it has a box shape, the shape that is perceived by the eye comes from the luma channel, not the blue projection channel or red projection channel. Consequently, using the box filter on the blue projection channel and red projection channel does not adversely affect the overall quality.

Figure 29:
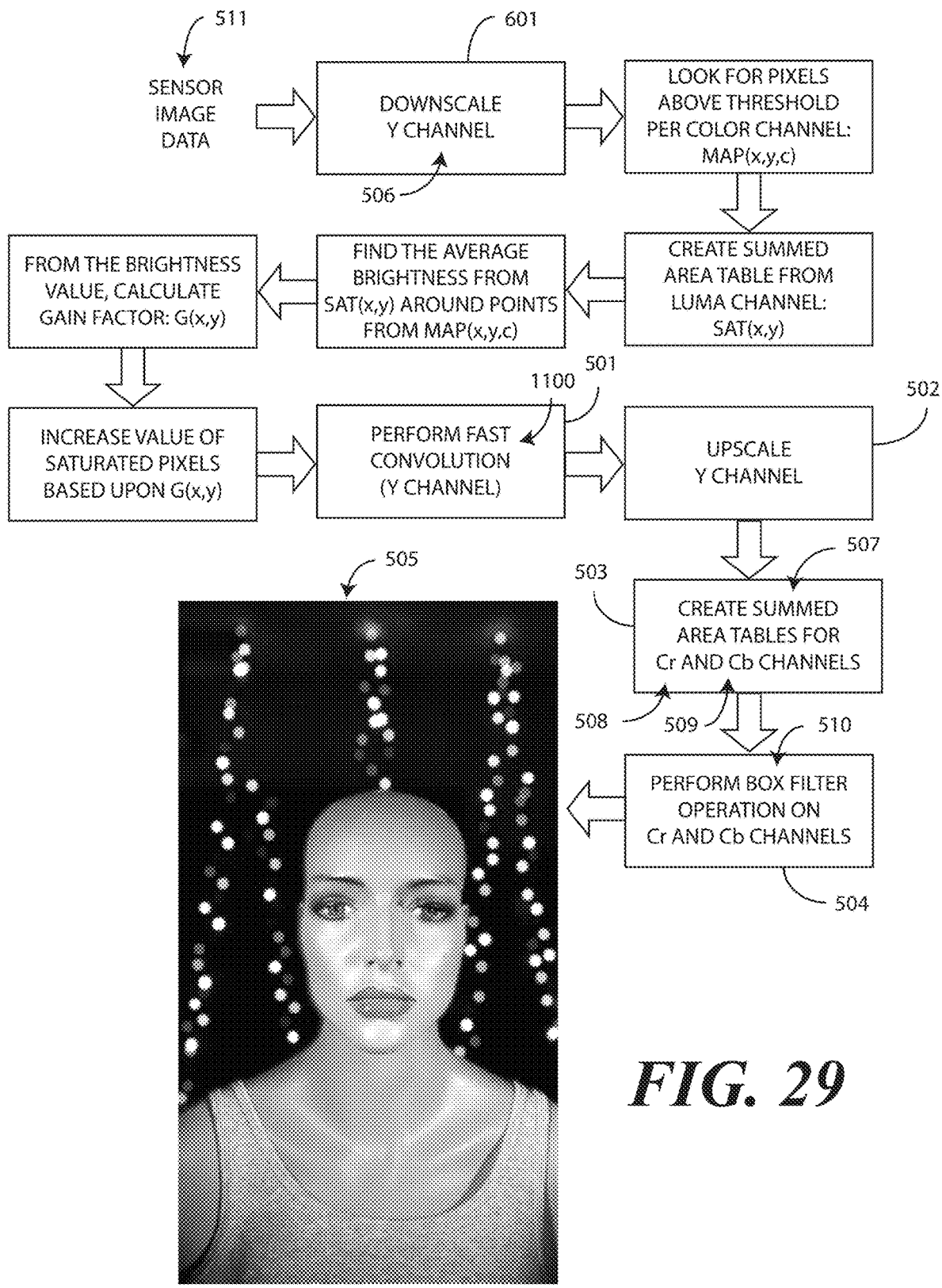
FIG. 29 illustrates one or more method steps in accordance with one or more embodiments of the disclosure.

Turning now briefly to FIG. 29, illustrated therein is the exact same image sensor data 511 as shown in FIG. 28. However, additional method steps have been incorporated.

In one or more embodiments, the one or more processors downscale the luma channel 506 of the image sensor data 511 representing a perceived intensity of pixels of the image sensor data 511 at step 601. The steps of FIG. 28 are performed, with step 502 upscaling the luma channel after step 501 performs the fast convolution 1100 with the blur kernel.

At step 503, the one or more processors blur at least some other of the image sensor data 511 by creating other summed area tables 705 for the blue projection channel 509 and the red projection channel 508 of the altered image sensor data. Thereafter, step 504 comprises applying a box filter 510 to the other summed area tables 507 created at step 503. This results in altered image sensor data 505 exhibiting a simulated bokeh effect that can be presented on a user interface of an electronic device. By comparing the altered image sensor data 505 of FIGS. 29, and 28 it can be seen that while some tricks to increase speed were taken in FIG. 29, the difference in bokeh effect from the slower method of FIG. 28 is hardly noticeable, if noticeable at all.

So, finally returning to FIG. 5, illustrated therein is the method 500 employing all of these "hacks" to make the overall method lighting fast. The method 500 of FIG. 5 combines the various steps previously described into one harmonious method 500 for simulating a bokeh effect in an electronic device having one or more processors.

To begin, the one or more processors receive, from an image sensor of an image capture device, image sensor data 511. At step 601, the one or more processors downscale the luma channel 506 of the image sensor data 511 representing a perceived intensity of pixels of the image sensor data 511. At step 701, the one or more processors select saturated pixels 1304 by determining which pixels of the image sensor data 411 have a luma value greater than a predefined minimum luma value threshold 707.

At steps 703,704, the one or more processors of the electronic device determine the average brightness value for a predetermined number of pixels surrounding, and including, each saturated pixel of the image sensor data 511. In one or more embodiments, the predetermined number of pixels surrounding, and including, each saturated pixel is less than a predefined maximum saturated pixel count threshold.

To be as fast as possible, in one or more embodiments a summed area table 705 is used at step 703 to find the average brightness value 706 at step 704. Moreover, in one or more embodiments a single luma channel is used at steps 703,704 rather than all three color channels. In one or more embodiments, step 704 comprises determining the average brightness value 706 by creating a summed area table 705 for the predefined number of pixels surrounding, and including, each saturated pixel.

At step 801, the gain factor 1305 is determined as described above with reference to FIG. 8. At step 1301, the one or more processors increase an intensity value 1303 of saturated pixels 1304 by the gain factor 1305, which is determined as a function of brightness values of pixels in the image sensor data 511.

At step 501, the one or more processors blur at least some of the image sensor data 511 by convolving a blur kernel having a predefined shape with the image sensor data 511 to create altered image sensor data simulating a bokeh effect. In one or more embodiments, this step 501 comprises performing a fast convolution 1100 where a CIRC function (1000) translates across the image sensor data 511. In one or more embodiments, the fast convolution 1100 comprises adding convolution product values for a first set of pixels (1106) entering the predefined shape defined by the CIRC function (1000) when the blur kernel translates, subtracting convolution product values for a second set of pixels (1107) exiting the predefined shape defined by the CIRC function (1000) when the blur kernel translates, and without recalculating product values of a third set of pixels (1108) remaining within the predefined shape defined by the CIRC function (1000) when the blur kernel translates. This greatly expedites the time for blurring the image sensor data 511 and reduces the number of computations sufficiently that the blurring process can be used even for viewfinder modes of operation.

At step 502, the one or more processors upscale the luma channel 506 of the altered image sensor data. At step 503, the one or more processors blur at least some other of the image sensor data 511 by creating other summed area tables 705 for the blue projection channel 509 and the red projection channel 508 of the altered image sensor data. Thereafter, step 504 comprises applying a box filter 510 to the other summed area tables 507 created at step 503. This results in altered image sensor data exhibiting a simulated bokeh effect that can be presented on a user interface of an electronic device.

Figure 14:
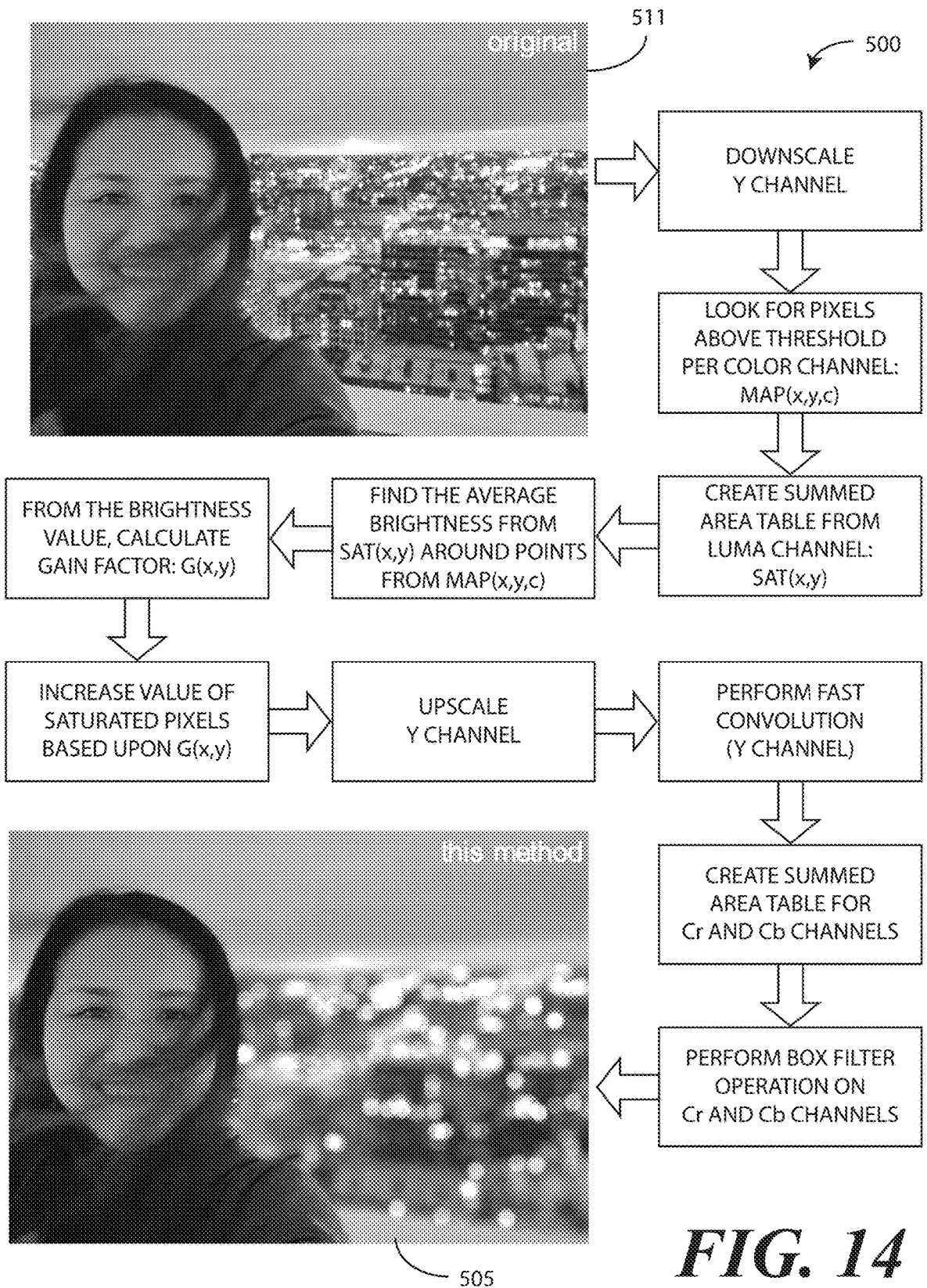
FIG. 14 illustrates one or more method steps in accordance with one or more embodiments of the disclosure.

Turning now to FIG. 14, illustrated therein is one actual result of performing the method 500 of FIG. 5. Shown in FIG. 14 is image sensor data 511 received from an image sensor of an image capture device of an electronic device. The method 500 of FIG. 5 is performed as described above, with one or more processors of the electronic device selecting saturated pixels of the image sensor data, determining a gain factor as a function of brightness values of pixels in the image sensor data 511, increasing an intensity value of the saturated pixels by the gain factor to create scaled image sensor data, and blurring at least some of the scaled image sensor data by convolving a blur kernel with the scaled image sensor data to create altered image sensor data 505 exhibiting a simulated bokeh effect.

Figure 15:
FIG. 15 illustrates the output of one explanatory method in accordance with one or more embodiments of the disclosure.
Figure 16:
FIG. 16 illustrates the output of a prior art method for simulating bokeh.
Figure 17:
FIG. 17 illustrates optically generated bokeh from a prior art device.

The altered image sensor data 505 can then be presented on a display of the electronic device. FIG. 15 presents this altered image sensor data 505, which can be compared an image 1605 simulating a bokeh effect in accordance with the prior art method of FIG. 4 shown in FIG. 16 and optically created bokeh from a DSLR camera shown in the image 1705 of FIG. 17. AS shown in this comparison. The altered image sensor data 505 created using the method (500) of FIG. 5 produces a beautiful bokeh effect that enhances saturated portions of the image sensor data (511) from which it was created without over blurring or muddying the subject. Moreover, the process is fast enough to be used when the image capture device is operating in a viewfinder mode of operation.

The image sensor data (511) of FIG. 14 is taken when the background is fairly well lit. To illustrate how the method (500) of FIG. 5 can perform at night, when bokeh can be most impressive, turn now to FIG. 20.

Figure 20:
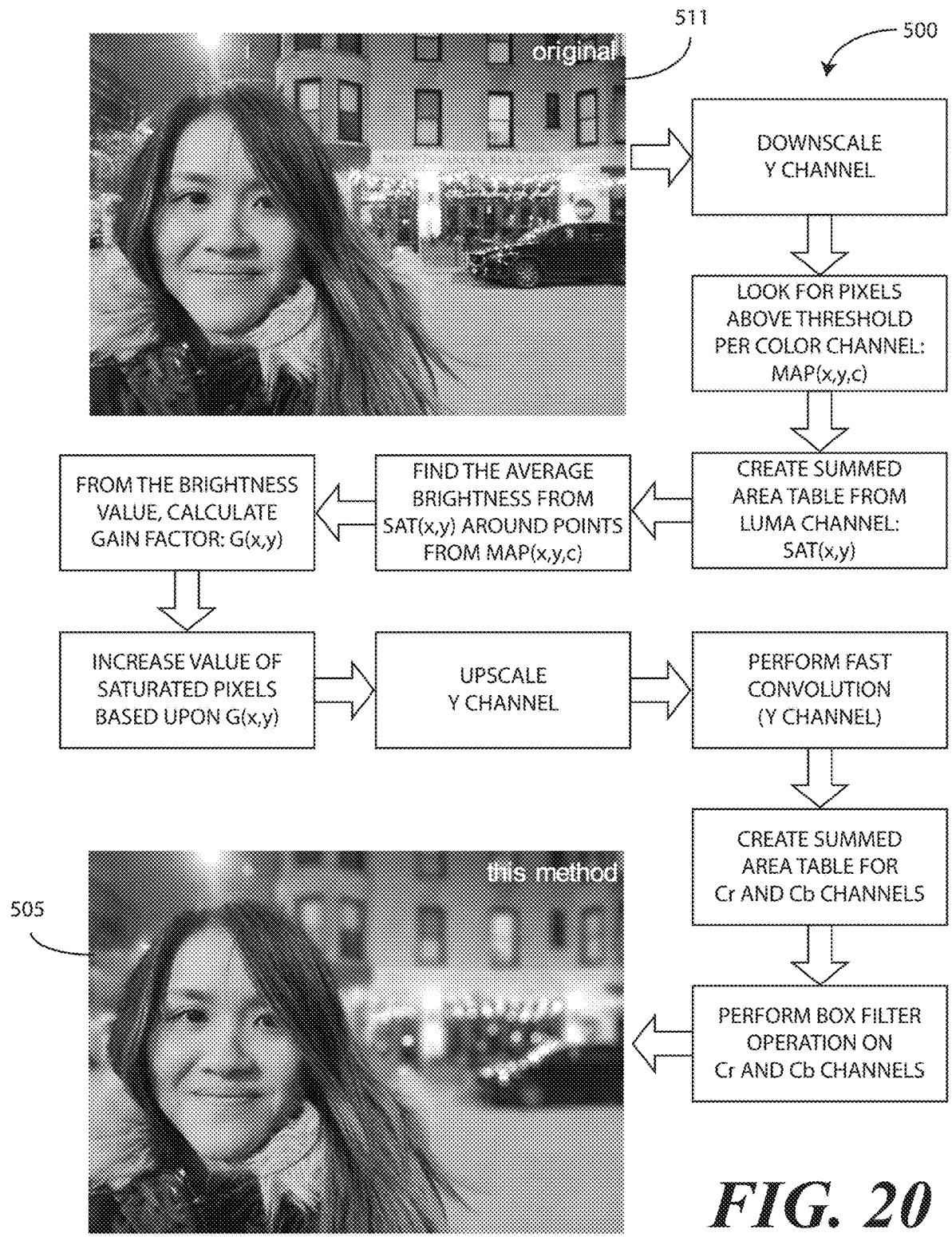
FIG. 20 illustrates one or more method steps in accordance with one or more embodiments of the disclosure.

Illustrated therein is another actual result of performing the method 500 of FIG. 5 with night shots. Shown in FIG. 20 is image sensor data 511 received from an image sensor of an image capture device of an electronic device. The method 500 of FIG. 5 is performed as described above. In one or more embodiments, one or more processors of the electronic device select saturated pixels of the image sensor data 511 by determining which pixels of the image sensor data 511 have a luma value greater than a predefined minimum luma value threshold, determine an average brightness value for a predetermined number of pixels surrounding, and including, each saturated pixel, determining a gain factor from the average brightness value, increasing an intensity value of the saturated pixels by the gain factor to create scaled image sensor data, and blurring at least some of the scaled image sensor data by convolving a blur kernel with the scaled image sensor data to create altered image sensor data 505 exhibiting the simulated bokeh effect. This altered image sensor data 505 can then be presented on the display of the electronic device.

Figure 21:
FIG. 21 illustrates the output of one explanatory method in accordance with one or more embodiments of the disclosure.
Figure 22:
FIG. 22 illustrates the output of a prior art method for simulating bokeh.
Figure 23:
FIG. 23 illustrates optically generated bokeh from a prior art device.

FIG. 21 presents this altered image sensor data 505, which can be compared an image 2205 simulating a bokeh effect in accordance with the prior art method of FIG. 4 shown in FIG. 22 and optically created bokeh from a DSLR camera shown in the image 2305 of FIG. 23. AS shown in this comparison. The altered image sensor data 505 created using the method (500) of FIG. 5 produces a beautiful bokeh effect that enhances saturated portions of the image sensor data (511) from which it was created without over blurring or muddying the subject. Moreover, the process is fast enough to be used when the image capture device is operating in a viewfinder mode of operation.

Figure 24:
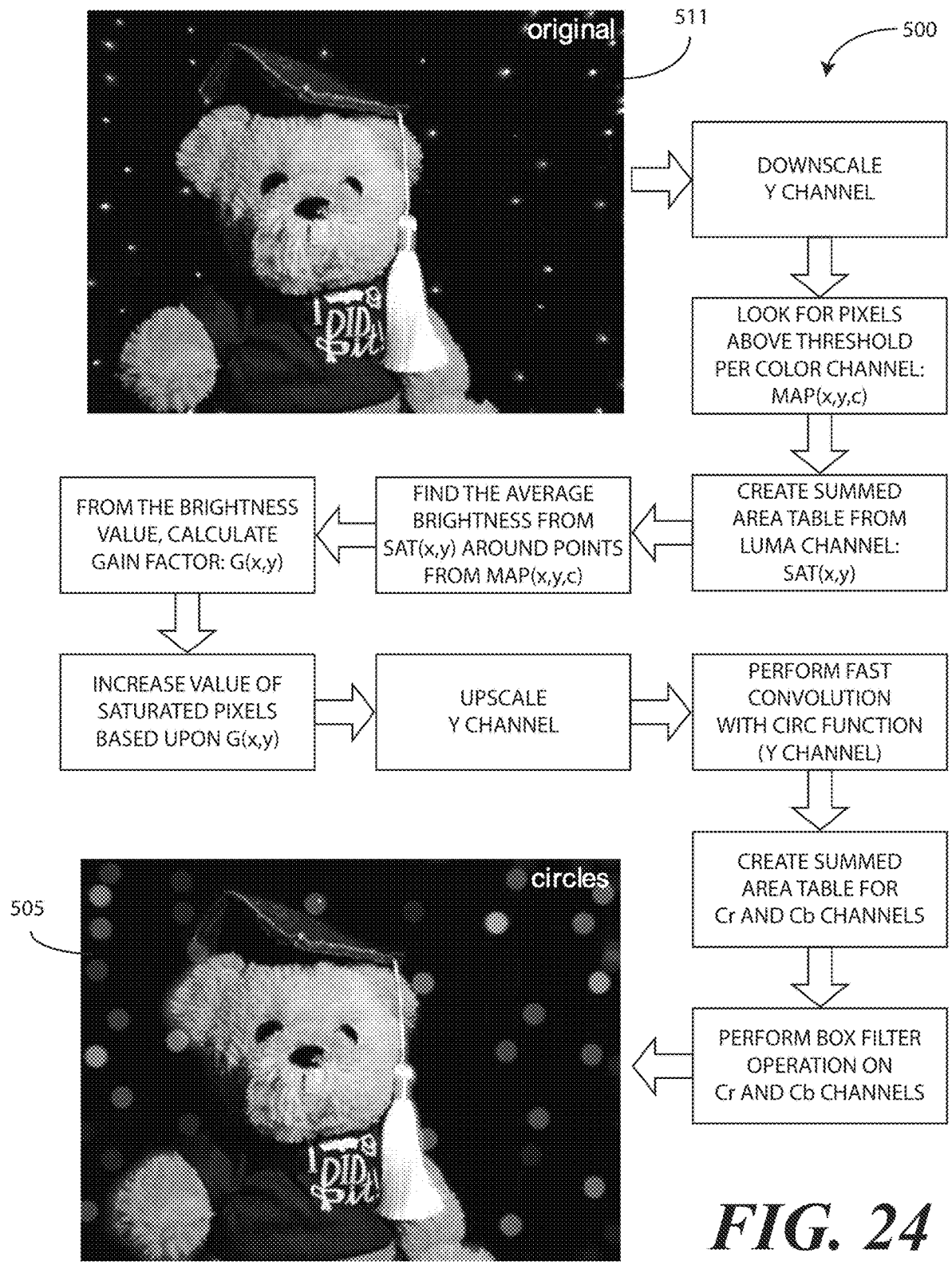
FIG. 24 illustrates one or more method steps in accordance with one or more embodiments of the disclosure.

In the images shown in FIGS. 14, 15, 20, and 21, the CIRC function (1000) is used as the blur kernel. This results in the predefined shape of the blur kernel resembling the projection of a lens of the image capture device since the projection is a pixelated circle. An example of this is shown in FIG. 24, where the image sensor data 511 depicts a bear with several lights in the background. When the method 500 of FIG. 5 is performed using the CIRC function (1000) as the blur kernel, the altered image sensor data 505 blurs those lights in the form of soft circles behind the bear.

Figure 25:
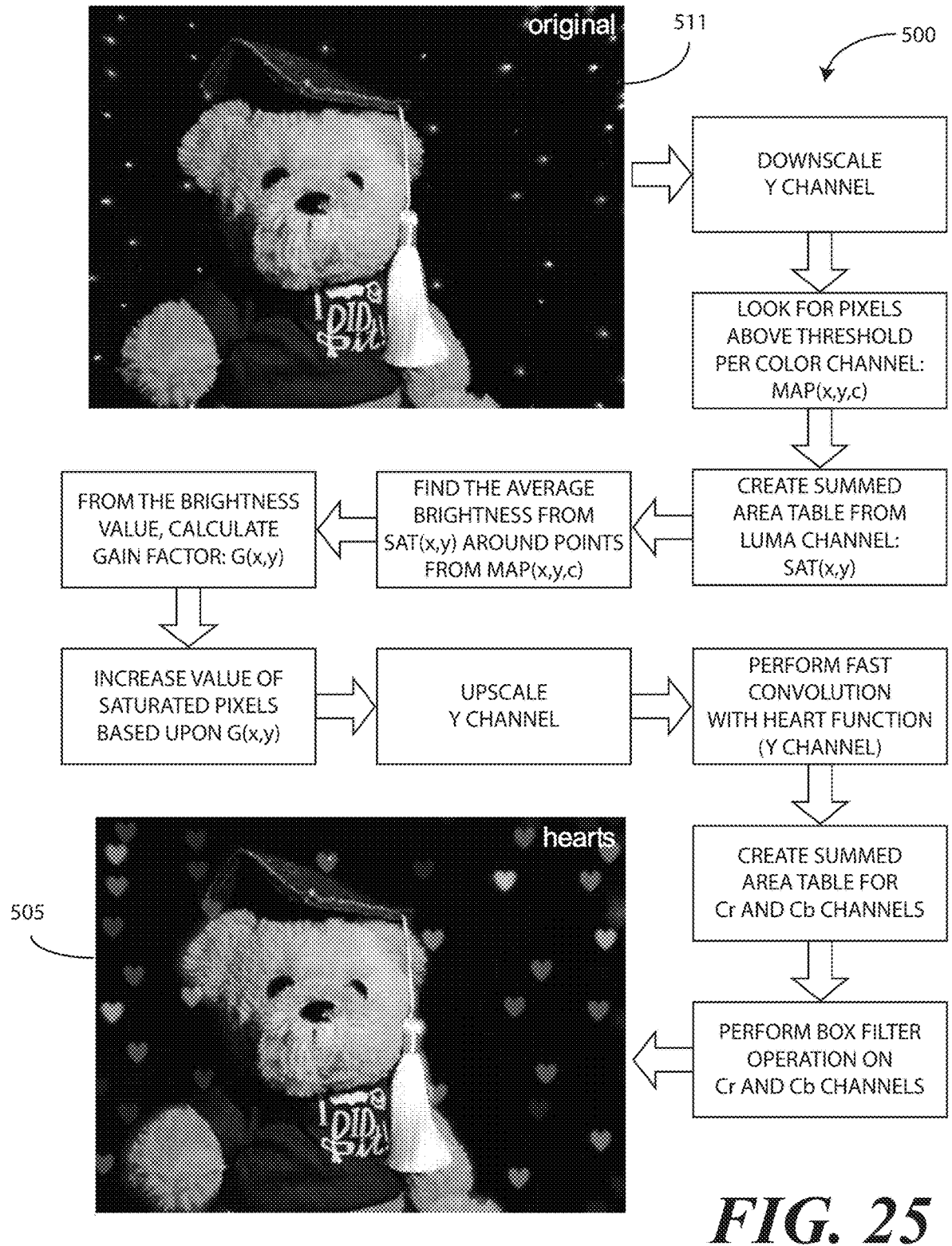
FIG. 25 illustrates one or more method steps in accordance with one or more embodiments of the disclosure.
Figure 26:
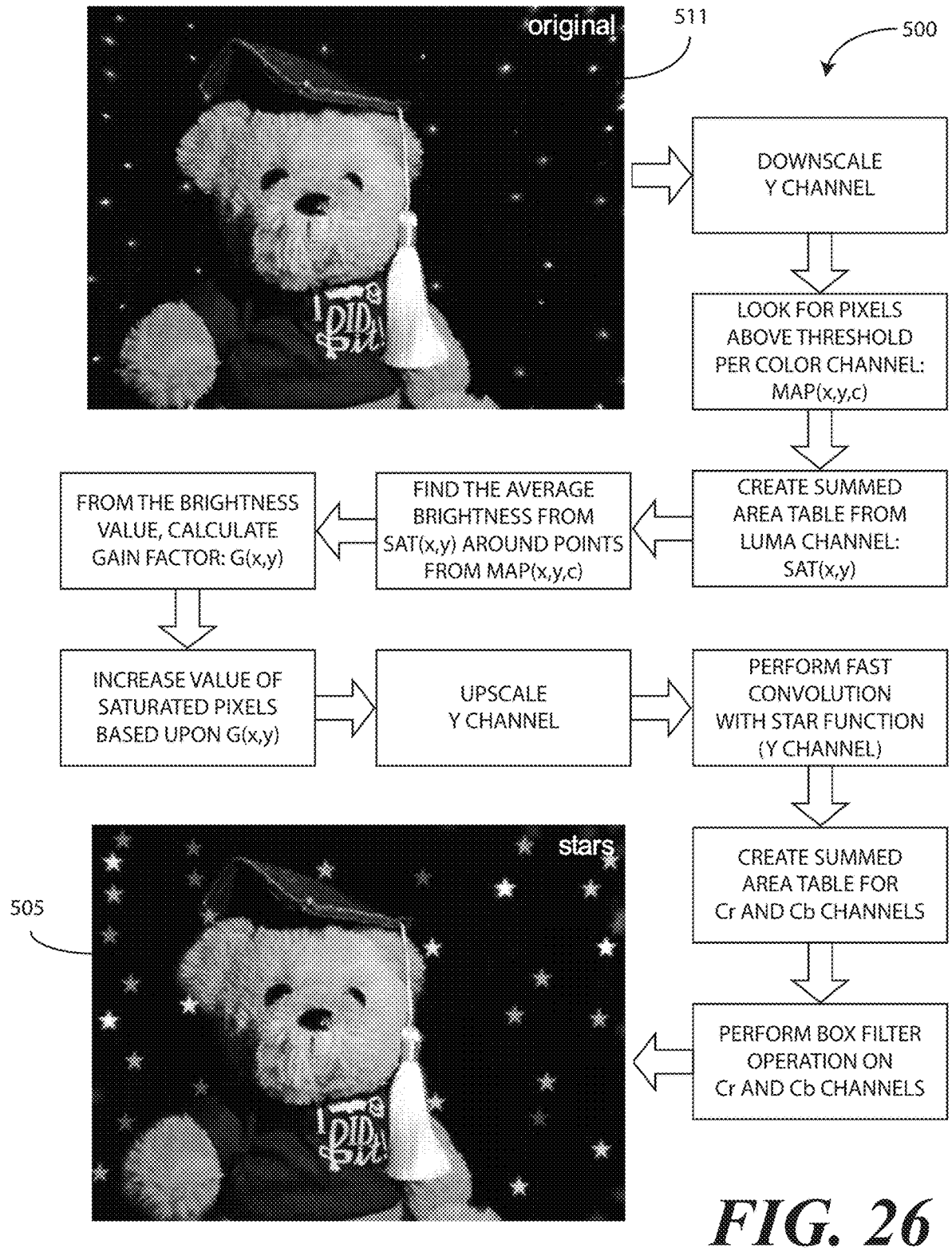
FIG. 26 illustrates one or more method steps in accordance with one or more embodiments of the disclosure.
Figure 27:
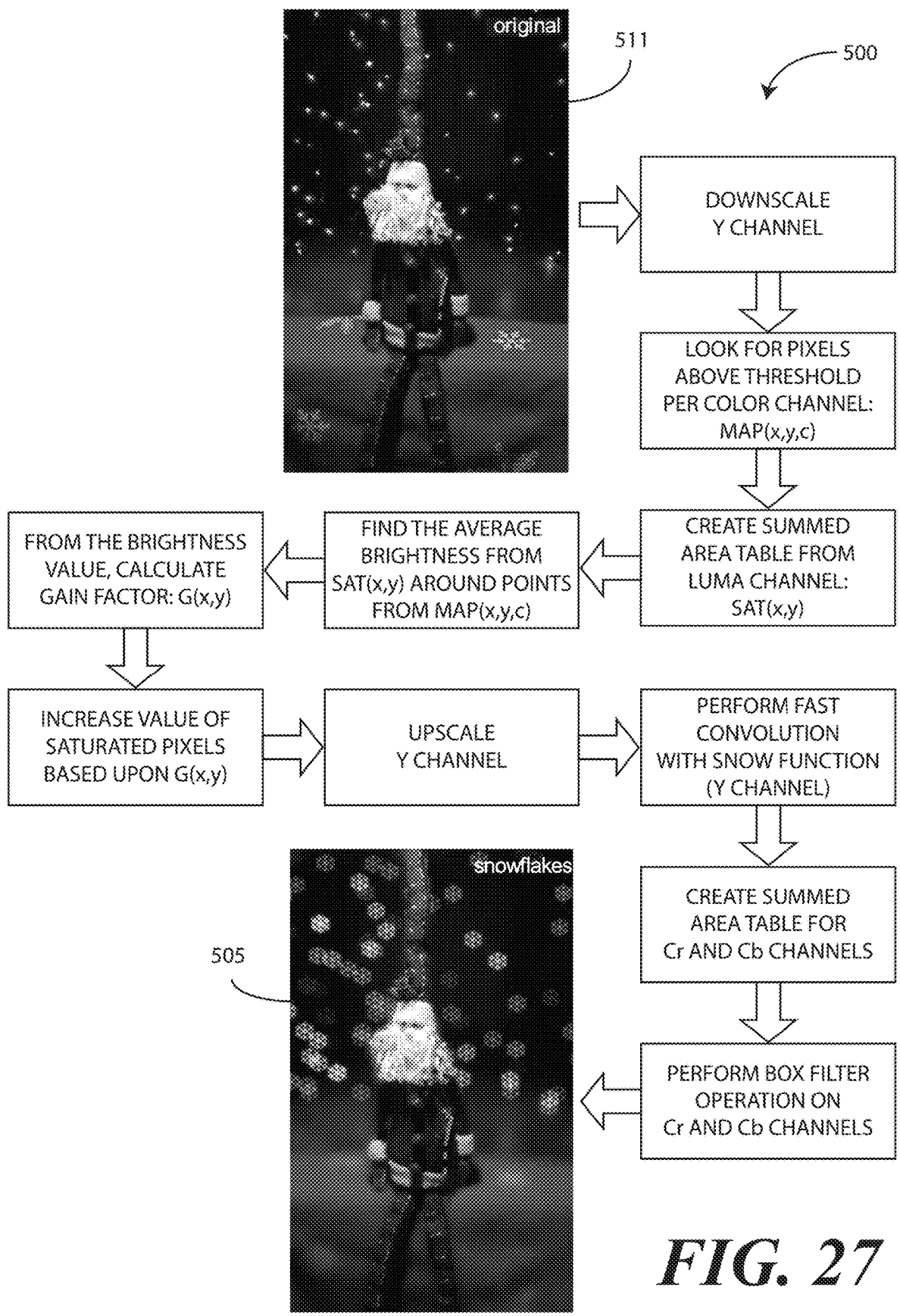
FIG. 27 illustrates one or more method steps in accordance with one or more embodiments of the disclosure.

However, as noted above, other functions and shapes can be used as the blur kernel. Examples of this are shown in FIGS. 25-27. Beginning with FIG. 25, the image sensor data 511 received from the image sensor of the image capture device again depicts the bear with the twinkling lights. However, when the method 500 of FIG. 5 is performed in this example, the blur kernel is shaped as a pixelated heart. Accordingly, as shown in the altered image sensor data 505, the method 500 has blurred the lights such that they take on a heart shape.

Turning now to FIG. 26, in this example the blur kernel is shaped as a pixelated star. When the method 500 is performed on the same image sensor data 511, the background lights become blurred such that they take on a star shape, as shown in the altered image sensor data 505. In FIG. 27, the blur kernel is shaped as a pixelated snowflake. When the method 500 is performed on the same image sensor data 511, the background lights become blurred such that they take on a star shape, as shown in the altered image sensor data 505. These examples of hearts, stars, and snowflakes are illustrative only, as numerous other shapes that can be used as blur kernels will be obvious to those of ordinary skill in the art having the benefit of this disclosure. FIGS. 25-27 merely illustrate examples of how embodiments of the disclosure can be expanded to provide new and amazing effects.

Figure 30:
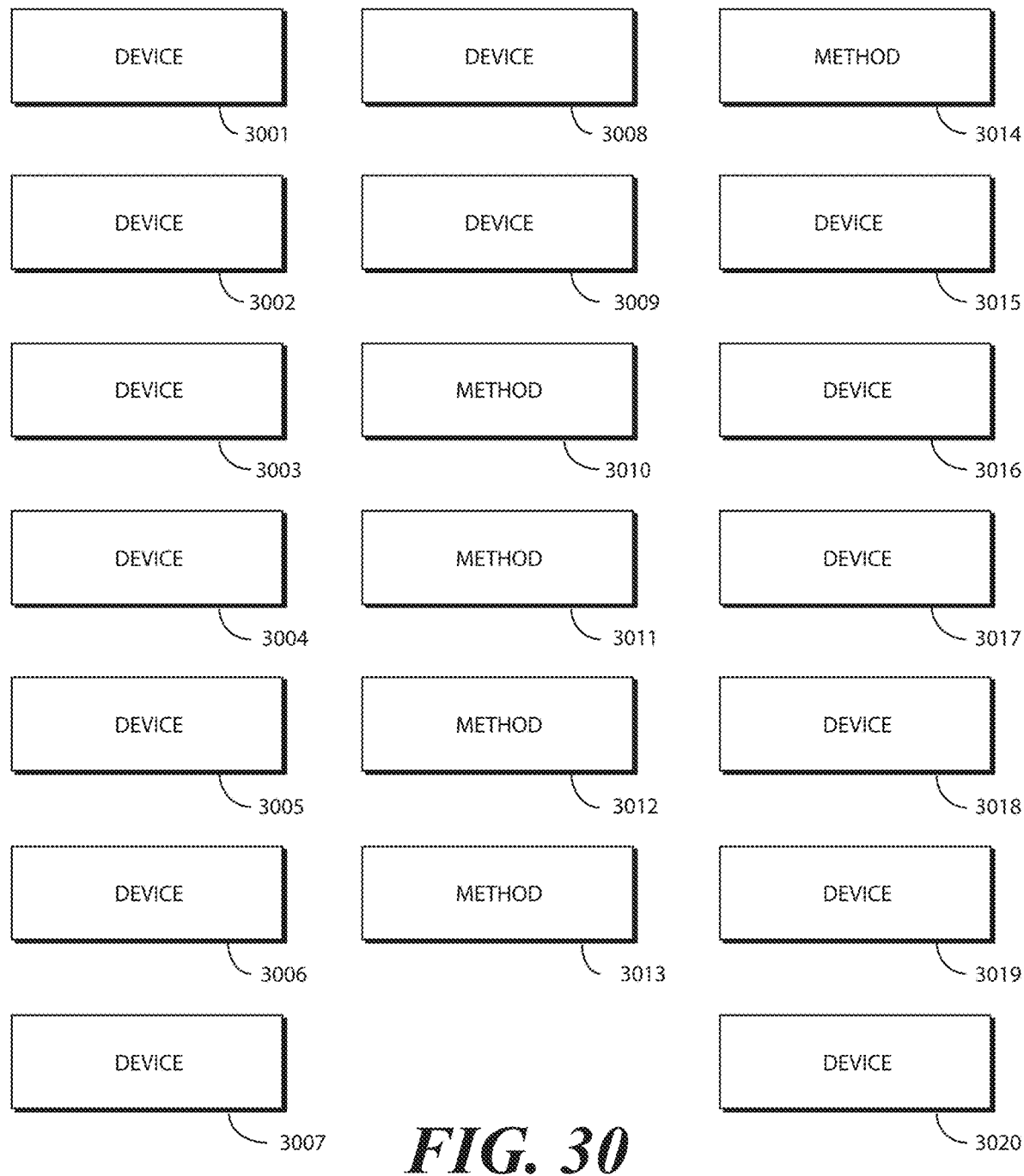
FIG. 30 illustrates various embodiments of the disclosure.

Turning now to FIG. 30, illustrated therein are various embodiments of the disclosure. The embodiments of FIG. 30 are shown as labeled boxes in FIG. 30 due to the fact that the individual components of these embodiments have been illustrated in detail in FIGS. 1-29, which precede FIG. 30. Accordingly, since these items have previously been illustrated and described, their repeated illustration is no longer essential for a proper understanding of these embodiments. Thus, the embodiments are shown as labeled boxes.

At 3001, a method for an electronic device comprises receiving, by one or more processors from an image sensor of an image capture device, image sensor data. At 3001, the method comprises increasing, by the one or more processors, an intensity value of saturated pixels by a gain factor determined as a function of brightness values of pixels of the image sensor data.

At 3001, the method comprises blurring, by the one or more processors, at least some of the image sensor data by convolving a blur kernel having a predefined shape with the image sensor data to create altered image sensor data exhibiting a simulated bokeh effect. At 3001, the method comprises presenting, by the one or more processors, the altered image sensor data on a user interface of the electronic device.

At 3002, the predefined shape of 3001 is a projection of a lens aperture of the image capture device. At 3003, the predefined shape of 3002 comprises a pixelated circle. At 3004, the predefined shape of 3001 comprises one of a pixelated heart, a pixelated star, or a pixelated snowflake.

At 3005, the blur kernel of 3001 has a dimension of N pixels by N pixels and the blurring comprises performing a quick convolution consisting of a number of product operations proportional to 2*N and less than N*N. At 3006, the predefined shape of 3001 spans a plurality of pixels of the image sensor data and the convolving the blur kernel comprises translating the predefined shape across the image sensor data while adding convolution product values for a first set of pixels entering the predefined shape when the blur kernel translates, subtracting convolution product values for a second set of pixels exiting the predefined shape when the blur kernel translates, and without recalculating product values of a third set of pixels remaining within the predefined shape when the blur kernel translates.

At 3007, the gain factor of 3006 is greater than or equal to one. At 3008, the gain factor of 3007 has a formula of:
G=K1*Bv+K3, where:
G represents the gain factor;
Bv represents a brightness value associated with the saturated pixels:
K1 and K3 are tunable constants; and
when G is less than one, G is defined to be one.

At 3009, the Bv factor of 3008 represents an average brightness value for a predefined number of pixels surrounding, and including, each saturated pixel. At 3010, the method of 3009 further comprises determining, by the one or more processors, the average brightness value by creating a summed area table for the predefined number of pixels surrounding, and including, each saturated pixel.

At 3011, the saturated pixels of 3009 each have a luma value greater than a predefined minimum luma value threshold. At 3011, the predefined number of pixels surrounding, and including, each saturated pixel is less than a predefined maximum saturated pixel count threshold.

At 3012, the method of 3009 further comprises, by the one or more processors before the increasing the intensity value of the saturated pixels by the gain factor downscaling a luma (Y) channel of the image sensor data representing perceived intensity of pixels of the image sensor data, selecting the saturated pixels by determining which pixels of the image sensor data have a luma value greater than a predefined minimum luma value threshold, and determining the average brightness value by creating a summed area table for the predefined number of pixels surrounding, and including, each saturated pixel.

At 3013, the method of 3012 further comprises, by the one or more processors after the blurring the at least some of the image sensor data upscaling the luma (Y) channel of the altered image sensor data and blurring at least some other of the image sensor data. At 3013, the blurring is accomplished by creating other summed area tables for a blue projection (Cb) channel of the altered image sensor data and a red projection (Cr) channel of the altered image sensor data and applying a box filter to the other summed area tables. At 3014, the presenting the altered image sensor data of 3001 occurs while the image capture device is operating in a preview mode of operation.

At 3015, an electronic device comprises an image capture device configured to capture image sensor data in response to initiation of an image capture operation. At 3015, the electronic device comprises one or more processors and a display operable with the one or more processors. At 3015, the one or more processors select saturated pixels of the image sensor data and determine a gain factor as a function of brightness values of pixels in the image sensor data. At 3015, the one or more processors increase an intensity value of the saturated pixels by the gain factor to create scaled image sensor data, blur at least some of the scaled image sensor data by convolving a blur kernel with the scaled image sensor data to create altered image sensor data exhibiting a simulated bokeh effect, and cause the display to present the altered image sensor data exhibiting the simulated bokeh effect.

At 3016, the image sensor data of 3015 depicts a low-light image and the saturated pixels depict lights within a field of view of the image capture device. At 3017, the one or more processors of 3016 blur the at least some of the scaled image sensor data by convolving a CIRC function with the scaled image sensor data.

At 3018, a method for an electronic device comprises receiving, by one or more processors from an image sensor of an image capture device, image sensor data. At 3018, the method comprises selecting, by the one or more processors, saturated pixels of the image sensor data by determining which pixels of the image sensor data have a luma value greater than a predefined minimum luma value threshold.

At 3018, the method comprises determining, by the one or more processors, an average brightness value for a predefined number of pixels surrounding, and including, each saturated pixel, determining, by the one or more processors, a gain factor from the average brightness value, and increasing, by the one or more processors, an intensity value of the saturated pixels by the gain factor to create scaled image sensor data. At 3018, the method comprises blurring, by the one or more processors, at least some of the scaled image sensor data by convolving a blur kernel with the scaled image sensor data to create altered image sensor data exhibiting a simulated bokeh effect and presenting, by the one or more processors, the altered image sensor data on a user interface of the electronic device.

At 3019, the method of 3018 further comprises, by the one or more processors before the selecting the saturated pixels of the image sensor data, downscaling a luma (Y) channel of the image sensor data representing perceived intensity of pixels of the image sensor data and, by the one or more processors after the blurring the at least some of the scaled image sensor data, upscaling the luma (Y) channel of the altered image sensor data.

At 3020, the method of 3019 further comprises blurring at least some other of the image sensor data by creating other summed area tables for a blue projection channel of the altered image sensor data and a red projection channel of the altered image sensor data and applying a box filter to the other summed area tables.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for an electronic device, the method comprising:
   receiving, by one or more processors from an image sensor of an image capture device, image sensor data;
   increasing, by the one or more processors, an intensity value of saturated pixels by a gain factor determined as a function of brightness values of pixels of the image sensor data;
   blurring, by the one or more processors, at least some of the image sensor data by convolving a blur kernel having a predefined shape with the image sensor data to create altered image sensor data exhibiting a simulated bokeh effect; and
   presenting, by the one or more processors, the altered image sensor data on a user interface of the electronic device.

2. The method of claim 1, wherein the predefined shape is a projection of a lens aperture of the image capture device.

3. The method of claim 2, wherein the predefined shape comprises a pixelated circle.

4. The method of claim 1, wherein the predefined shape comprises one of a pixelated heart, a pixelated star, or a pixelated snowflake.

5. The method of claim 1, wherein:
   the blur kernel has a dimension of N pixels by N pixels; and
   the blurring comprises performing a quick convolution consisting of a number of product operations proportional to $2*N$ and less than $N*N$.

6. The method of claim 1, wherein:
   the predefined shape spans a plurality of pixels of the image sensor data; and
   the convolving the blur kernel comprises translating the predefined shape across the image sensor data while:
      adding convolution product values for a first set of pixels entering the predefined shape when the blur kernel translates;
      subtracting convolution product values for a second set of pixels exiting the predefined shape when the blur kernel translates; and
      without recalculating product values of a third set of pixels remaining within the predefined shape when the blur kernel translates.

7. The method of claim 6, wherein the gain factor is greater than or equal to one.

8. The method of claim 7, wherein the gain factor has a formula of:
   $G=K1*Bv+K3$, where:
      G represents the gain factor;
      Bv represents a brightness value associated with the saturated pixels:
      K1 and K3 are tunable constants; and
      when G is less than one, G is defined to be one.

9. The method of claim 8, where Bv represents an average brightness value for a predefined number of pixels surrounding, and including, each saturated pixel.

10. The method of claim 9, further comprising determining, by the one or more processors, the average brightness value by creating a summed area table for the predefined number of pixels surrounding, and including, the each saturated pixel.

11. The method of claim 9, wherein:
    the saturated pixels each have a luma value greater than a predefined minimum luma value threshold; and
    the predefined number of pixels surrounding, and including, the each saturated pixel is less than a predefined maximum saturated pixel count threshold.

12. The method of claim 9, further comprising, by the one or more processors before the increasing the intensity value of the saturated pixels by the gain factor:
    downscaling a luma (Y) channel of the image sensor data representing perceived intensity of pixels of the image sensor data;
    selecting the saturated pixels by determining which pixels of the image sensor data have a luma value greater than a predefined minimum luma value threshold; and
    determining the average brightness value by creating a summed area table for the predefined number of pixels surrounding, and including, the each saturated pixel.

13. The method of claim 12, further comprising, by the one or more processors after the blurring the at least some of the image sensor data:
    upscaling the luma (Y) channel of the altered image sensor data; and
    blurring at least some other of the image sensor data by:

creating other summed area tables for a blue projection (Cb) channel of the altered image sensor data and a red projection (Cr) channel of the altered image sensor data; and applying a box filter to the other summed area tables.

14. The method of claim 1, wherein the presenting the altered image sensor data occurs while the image capture device is operating in a preview mode of operation.

15. An electronic device, comprising:
an image capture device configured to capture image sensor data in response to initiation of an image capture operation;
one or more processors; and
a display operable with the one or more processors;
wherein the one or more processors:
select saturated pixels of the image sensor data;
determine a gain factor as a function of brightness values of pixels in the image sensor data;
increase an intensity value of the saturated pixels by the gain factor to create scaled image sensor data;
blur at least some of the scaled image sensor data by convolving a blur kernel with the scaled image sensor data to create altered image sensor data exhibiting a simulated bokeh effect; and
cause the display to present the altered image sensor data exhibiting the simulated bokeh effect.

16. The electronic device of claim 15, wherein the image sensor data depicts a low-light image, and the saturated pixels depict lights within a field of view of the image capture device.

17. The electronic device of claim 16, wherein the one or more processors blur the at least some of the scaled image sensor data by convolving a CIRC function with the scaled image sensor data.

18. A method for an electronic device, the method comprising:
receiving, by one or more processors from an image sensor of an image capture device, image sensor data;
selecting, by the one or more processors, saturated pixels of the image sensor data by determining which pixels of the image sensor data have a luma value greater than a predefined minimum luma value threshold;
determining, by the one or more processors, an average brightness value for a predefined number of pixels surrounding, and including, each saturated pixel;
determining, by the one or more processors, a gain factor from the average brightness value;
increasing, by the one or more processors, an intensity value of the saturated pixels by the gain factor to create scaled image sensor data;
blurring, by the one or more processors, at least some of the scaled image sensor data by convolving a blur kernel with the scaled image sensor data to create altered image sensor data exhibiting a simulated bokeh effect; and
presenting, by the one or more processors, the altered image sensor data on a user interface of the electronic device.

19. The method of claim 18, further comprising:
by the one or more processors before the selecting the saturated pixels of the image sensor data, downscaling a luma (Y) channel of the image sensor data representing perceived intensity of pixels of the image sensor data; and
by the one or more processors after the blurring the at least some of the scaled image sensor data, upscaling the luma (Y) channel of the altered image sensor data.

20. The method of claim 19, further comprising:
blurring at least some other of the image sensor data by:
creating other summed area tables for a blue projection (Cb) channel of the altered image sensor data and a red projection (Cr) channel of the altered image sensor data; and
applying a box filter to the other summed area tables.

* * * * *